(12) United States Patent
Xie et al.

(10) Patent No.: US 12,120,504 B2
(45) Date of Patent: Oct. 15, 2024

(54) CONDITIONAL HANDOVER PROCESSING METHOD AND APPARATUS, RELATED DEVICE, AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Fang Xie, Beijing (CN); Nan Hu, Beijing (CN); Xiaodong Xu, Beijing (CN); Liang Liu, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

(*) Notice: Subject to any disclaimer, the term of this patent is extended or adjusted under 35 U.S.C. 154(b) by 565 days.

(21) Appl. No.: 17/419,380

(22) PCT Filed: Dec. 27, 2019

(86) PCT No.: PCT/CN2019/129413
§ 371 (c)(1),
(2) Date: Jun. 29, 2021

(87) PCT Pub. No.: WO2020/135777
PCT Pub. Date: Jul. 2, 2020

(65) Prior Publication Data
US 2022/0078675 A1 Mar. 10, 2022

(30) Foreign Application Priority Data
Dec. 29, 2018 (CN) .......................... 201811646308.8

(51) Int. Cl.
*H04W 4/00* (2018.01)
*H04W 36/00* (2009.01)
(Continued)

(52) U.S. Cl.
CPC .... *H04W 74/0833* (2013.01); *H04W 36/0011* (2013.01); *H04W 36/0064* (2023.05); *H04W 36/362* (2023.05); *H04W 36/304* (2023.05)

(58) Field of Classification Search
CPC . H04W 80/04; H04W 36/18; H04W 36/0011; H04W 36/14; H04W 36/08;
(Continued)

(56) References Cited

U.S. PATENT DOCUMENTS 11,350,328 B2 * 5/2022 Lee ................. H04W 36/362
2009/0303891 A1 12/2009 Lucas
(Continued)

FOREIGN PATENT DOCUMENTS

CN 107872852 A 4/2018
CN 108632926 A 10/2018
(Continued)

OTHER PUBLICATIONS

International Search Report in the international application No. PCT/CN2019/129413, mailed on Mar. 10, 2020, 2 pgs.
(Continued)

*Primary Examiner* — Phuongchau Ba Nguyen
(74) *Attorney, Agent, or Firm* — Cooper Legal Group, LLC

(57) ABSTRACT

The present application discloses a conditional handover (CHO) processing method and apparatus, a related device, and a storage medium. The method comprises: a first network device determining that CHO configuration informa-
(Continued)

tion is invalid and indicating to a terminal that the CHO configuration information is invalid.

17 Claims, 10 Drawing Sheets

(51) Int. Cl.
*H04W 36/36* (2009.01)
*H04W 74/0833* (2024.01)
*H04W 36/30* (2009.01)

(58) Field of Classification Search
CPC ......... H04W 36/0055; H04W 74/0833; H04W 36/0079; H04W 36/36; H04W 36/30
See application file for complete search history.

(56) References Cited

U.S. PATENT DOCUMENTS

| | | | |
|---|---|---|---|
| 2014/0126545 A1* | 5/2014 | Tamura | H04W 36/302 370/332 |
| 2016/0219475 A1 | 7/2016 | Kim | |
| 2019/0223073 A1* | 7/2019 | Chen | H04W 36/0079 |
| 2019/0281511 A1* | 9/2019 | Susitaival | H04W 36/36 |
| 2020/0022042 A1* | 1/2020 | Yin | H04W 36/00837 |
| 2020/0022055 A1* | 1/2020 | Yan | H04W 36/00837 |
| 2020/0077314 A1* | 3/2020 | Hwang | H04W 36/362 |
| 2020/0154326 A1* | 5/2020 | Deenoo | H04W 74/0833 |
| 2020/0281038 A1* | 9/2020 | Fujishiro | H04W 36/305 |
| 2021/0076271 A1* | 3/2021 | Jokela | H04W 36/362 |
| 2021/0360495 A1* | 11/2021 | Lovlekar | H04W 36/00837 |
| 2022/0007254 A1* | 1/2022 | Da Silva | H04W 36/0016 |
| 2022/0201561 A1* | 6/2022 | Bin Redhwan | H04W 36/00837 |

FOREIGN PATENT DOCUMENTS

| | | |
|---|---|---|
| CN | 108924890 A | 11/2018 |
| WO | 2018175819 A1 | 9/2018 |
| WO | 2018194326 A1 | 10/2018 |

OTHER PUBLICATIONS

English translation of the Written Opinion of the International Search Authority in the international application No. PCT/CN2019/129413, mailed on Mar. 10, 2020, 4 pgs.

* cited by examiner

… (1)

CONDITIONAL HANDOVER PROCESSING METHOD AND APPARATUS, RELATED DEVICE, AND STORAGE MEDIUM

CROSS-REFERENCE TO RELATED APPLICATION

This application is based upon and claims priority to Chinese Patent Application No. 201811646308.8, filed on Dec. 29, 2018, the disclosure of which is hereby incorporated by reference in its entirety.

TECHNICAL FIELD

The application relates to the field of wireless communication, and particularly to a Conditional HandOver (CHO)-based processing method and apparatus, a related device, and a storage medium.

BACKGROUND

Conditional HandOver (CHO), as shown in FIG. 1, is a mechanism capable of improving the robustness of a HandOver (HO) process, namely when channel quality between a User Equipment (UE) and a serving cell declines suddenly (particularly at a high frequency or during high-speed movement of the UE), and thus the UE cannot receive a HO command and complete a HO process normally, a source base station may configure measurement reporting of the UE to be triggered at a relatively low threshold, the HO command contains a relatively high HO triggering threshold, and may further contain a random access resource used by the UE in a target cell, and once the HO threshold is satisfied, the UE initiates a random access process to a target base station.

However, for how the UE and the source base station work normally in the CHO mechanism, there is yet no effective solution in the related art.

SUMMARY

For solving the related technical problem, embodiments of the application provide a CHO-based processing method and apparatus, a related device, and a storage medium.

The technical solutions of the embodiments of the application are implemented as follows.

The embodiments of the application provide a CHO-based processing method, which may be applied to a first network device and include one of the following operations.

Priority information is sent to at least one candidate second network device for HO, the priority information being configured to indicate a priority at which the second network device serves a terminal.

A cell-level dedicated random access resource for CHO is configured.

A condition for CHO is configured for the terminal, and a first timer is sent, here, after the first timer expires, the configured condition is invalid, and/or a dedicated random access resource, configured for CHO of the terminal, of the at least one candidate second network device may be released.

After CHO is configured for the terminal, the at least one candidate second network device for HO is notified.

The first network device may presently provide service for the terminal.

In the solution, the operation that the priority information is sent to the at least one candidate second network device for HO may include the following operation.

A HO request message is sent to the at least one candidate second network device, the HO message request containing the priority information.

In the solution, the operation that the cell-level dedicated random access resource for CHO is configured may include the following operation.

The cell-level dedicated random access resource for CHO is configured through system information.

In the solution, the first timer may be configured by the first network device, or may be configured by the candidate second network device.

In the solution, the method may further include the following operation.

Capability information reported by the terminal is received, the capability information representing that the terminal supports CHO.

In the solution, the second network device may configure a UE-level dedicated random access resource for CHO or a cell-level dedicated random access resource for CHO for the terminal.

In the solution, the method may further include the following operation.

Information indicating that the first network device supports CHO is sent to the terminal and/or the second network device.

The embodiments of the application also provide a CHO-based processing method, which may be applied to a terminal and include the following operations.

Based on configuration information of CHO, one of the following operations is performed.

CHO is determined to be performed, and CHO is performed using a configured cell-level dedicated random access resource for CHO.

After the configuration information of CHO is received, a first timer is started, after the first timer expires, a configured condition is invalid, and/or a random access resource, configured for CHO of the terminal, of at least one candidate second network device for HO may be released.

In the solution, the method may further include the following operation.

The cell-level dedicated random access resource for CHO is received through system information.

In the solution, the method may further include the following operation.

Capability information is reported to a first network device, the capability information representing that the terminal supports CHO.

In the solution, the method may further include the following operation.

Information indicating that the first network device supports CHO is received from the first network device.

In the solution, the second network device may configure a UE-level dedicated random access resource for CHO or a cell-level dedicated random access resource for CHO for the terminal.

The embodiments of the application also provide a CHO-based processing method, which may be applied to a second network device and include the following operations.

Priority information sent by a first network device is received, the priority information being configured to indicate a priority at which the second network device serves a terminal.

Or, a notification that the first network device has configured CHO for the terminal is received, and a second timer is started, wherein after the second timer expires, a dedicated random access resource allocated to the terminal could be released.

Or, a first timer is configured for the terminal, wherein after the first timer expires, a dedicated random access resource, configured for CHO of the terminal, of the second network device could be released.

The first network device may presently provide service for the terminal. The second network device may be a candidate target network device for HO.

In the solution, the second network device may configure a UE-level dedicated random access resource for CHO or a cell-level dedicated random access resource for CHO for the terminal.

In the solution, the method may further include the following operation.

Information indicating that the first network device supports CHO is received from the first network device.

The embodiments of the application also provide a CHO-based processing method, which may be applied to a first network device and include the following operation.

Another second network device, except a target network device for HO, in at least one candidate second network device is notified that HO is canceled.

In the solution, the operation that the another second network device, except the target network device for HO, in the at least one candidate second network device is notified that HO is canceled may include the following operation.

The another second network device, except the target network device for HO, in the at least one candidate second network device is notified, through a HO cancel message, that HO is canceled.

In the solution, the another second network device may be determined to be notified in one of the following manners.

An immediate HO message is sent to a terminal.

A notification that HO to the target second network device succeeds or the terminal has initiated an access request to the target second network device is received.

Identification information, notified by the terminal, of the target second network device for HO or a target cell is received.

An indication of information of invalid CHO configuration corresponding to the another second network device or cell is received from the terminal.

In the solution, the method may further include the following operation.

Capability information reported by the terminal is received, the capability information representing that the terminal supports CHO.

In the solution, the second network device may configure a UE-level dedicated random access resource for CHO or a cell-level dedicated random access resource for CHO for the terminal.

In the solution, the method may further include the following operation.

Information indicating that the first network device supports CHO is sent to the terminal and/or the second network device.

The embodiments of the application also provide a CHO-based processing method, which may be applied to a first network device and include the following operation.

CHO information corresponding to each frequency is configured for a terminal.

In the solution, the method may further include the following operation.

Capability information reported by the terminal is received, the capability information representing that the terminal supports CHO.

In the solution, the method may further include the following operation.

Information indicating that the first network device supports CHO is sent to the terminal.

The embodiments of the application also provide a CHO-based processing method, which may be applied to a terminal and include the following operations.

HO is determined to be performed, and a cell for HO is determined.

A random access resource is determined using CHO configuration information corresponding to a frequency of the cell for HO.

Cell HO is performed using the determined random access resource.

In the solution, the method may further include the following operation.

Capability information is reported to a first network device, the capability information representing that the terminal supports CHO.

In the solution, the method may further include the following operation.

Information indicating that the first network device supports CHO is received from the first network device.

The embodiments of the application also provide a CHO-based processing method, which may be applied to a first network device and include the following operations.

Information of invalid CHO configuration is determined.

The information of invalid CHO configuration is indicated to a terminal.

In the solution, the operation that the information of invalid CHO configuration is indicated to the terminal may include the following operation.

The information of invalid CHO configuration is indicated to the terminal through a Radio Resource Control (RRC) reconfiguration message.

In the solution, an indication manner may include at least one of:
information of one or more invalid frequencies;
a related identity(ies) of an invalid cell(s); or
a condition for some of CHO configuration becoming invalid.

In the solution, the method may further include the following operation.

Capability information reported by the terminal is received, the capability information representing that the terminal supports CHO.

In the solution, the method may further include the following operation.

Information indicating that the first network device supports CHO is sent to the terminal.

The embodiments of the application also provide a CHO-based processing method, which may be applied to a terminal and include the following operations.

Information of invalid CHO configuration indicated by a first network device is received.

Information of local CHO configuration is updated with the information of the indicated invalid CHO configuration.

In the solution, the operation that the information of invalid CHO configuration indicated by the first network device is received may include the following operation.

The information of invalid CHO configuration indicated by the first network device is received through an RRC reconfiguration message.

In the solution, an indication manner may include at least one of:
information of one or more invalid frequencies;
a related identity(ies) of an invalid cell(s); or
a condition for some of CHO configuration becoming invalid.

In the solution, the method may further include the following operation.

Capability information is reported to the first network device, the capability information representing that the terminal supports CHO.

In the solution, the method may further include the following operation.

Information indicating that the first network device supports CHO is received from the first network device.

The embodiments of the application also provide a CHO-based processing method, which may be applied to a first network device and include the following operation.

CHO information for multiple candidate cells is configured for a terminal, and priority information of the CHO information for the multiple candidate cells is configured.

In the solution, the priority information may be configured implicitly or explicitly.

In the solution, the method may further include the following operation.

Capability information reported by the terminal is received, the capability information representing that the terminal supports CHO.

In the solution, the method may further include the following operation.

Information indicating that the first network device supports CHO is sent to the terminal.

The embodiments of the application also provide a CHO-based processing method, which may be applied to a terminal and include the following operations.

HO is determined to be performed.

CHO information for a target cell is determined according to configured priority information of CHO information for multiple candidate cells.

Cell HO is performed using a dedicated random access resource corresponding to the CHO information for the target cell.

In the solution, the method may further include the following operation.

Capability information is reported to a first network device, the capability information representing that the terminal supports CHO.

In the solution, the method may further include the following operation.

Information indicating that the first network device supports CHO is received from the first network device.

The embodiments of the application also provide a CHO-based processing method, which may be applied to a first network device and include the following operation.

CHO information is configured for a terminal, and a HO solution for access of the terminal to a target cell is configured to be one of the following solutions:
a Make-before-break solution;
an enhanced Make-before-break solution;
a Dual Active Protocol Stack (DAPS) solution;
a Random Access Channel (RACH)-less solution; and
a dual-connectivity-based solution.

In the solution, when the HO solution for access of the terminal to the target cell is configured, the following operations may be performed.

A HO solution sent by a second network device corresponding to the target cell is received.

The HO solution for access of the terminal to the target cell is configured using the received HO solution.

In the solution, the method may further include the following operation.

Capability information reported by the terminal is received, the capability information representing that the terminal supports CHO.

In the solution, the method may further include the following operation.

Information indicating that the first network device supports CHO is sent to the terminal.

The embodiments of the application also provide a CHO-based processing method, which may be applied to a terminal and include the following operations.

A target cell for HO is determined.

A HO solution for the target cell is determined using configuration information of the HO solution for the target cell.

Cell HO is performed using the determined HO solution, the configuration information representing that the HO solution for access of the terminal to the target cell is one of the following solutions:
a Make-before-break solution;
an enhanced Make-before-break solution;
a DAPS solution;
a RACH-less solution; and
a dual-connectivity-based solution.

In the solution, the method may further include the following operation.

Capability information is reported to a first network device, the capability information representing that the terminal supports CHO.

In the solution, the method may further include the following operation.

Information indicating that the first network device supports CHO is received from the first network device.

The embodiments of the application also provide a CHO-based processing apparatus, which may include a first processing unit, configured to execute one of the following operations:
sending priority information to at least one candidate second network device for HO, the priority information being configured to indicate a priority at which the second network device serves a terminal;
configuring a cell-level dedicated random access resource for CHO;
configuring a condition for CHO for the terminal, and sending a first timer, here, after the first timer expires, the configured condition is invalid, and/or a dedicated random access resource, configured for CHO of the terminal, of the at least one candidate second network device may be released; and
after CHO is configured for the terminal, notifying the at least one candidate second network device for HO.

In the solution, the apparatus may further include a first transceiver unit, configured to:
receive capability information reported by the terminal, the capability information representing that the terminal supports CHO, and/or, send information indicating that a first network device supports CHO to the terminal and/or the second network device, the first network device presently providing service for the terminal.

The embodiments of the application also provide a CHO-based processing apparatus, which may include a second processing unit, configured to, based on configuration information of CHO, execute one of the following operations:

determining to execute CHO, and performing CHO using a configured cell-level dedicated random access resource for CHO; and after the configuration information of CHO is received, starting a first timer, after the first timer expires, a configured condition is invalid, and/or a random access resource, configured for CHO of a terminal, of at least one candidate second network device for HO may be released.

In the solution, the apparatus may further include a second transceiver unit, configured to:

report capability information to a first network device, the capability information representing that the terminal supports CHO, and/or, receive information indicating that the first network device supports CHO from the first network device.

The embodiments of the application also provide a CHO-based processing apparatus, which may include a third transceiver unit, configured to:

receive priority information sent by a first network device, the priority information being configured to indicate a priority at which a second network device serves a terminal;

or, receive a notification that the first network device has configured CHO for the terminal, and start a second timer, wherein after the second timer expires, a dedicated random access resource allocated to the terminal could be released;

or, configure, through the first network device, a first timer for the terminal, wherein after the first timer expires, a dedicated random access resource, configured for CHO of the terminal, of the second network device could be released.

The first network device may presently provide service for the terminal. The second network device may be a candidate target network device for HO.

In the solution, the apparatus may further include a fourth transceiver unit, configured to receive information indicating that the first network device supports CHO from the first network device.

The embodiments of the application also provide a CHO-based processing apparatus, which may include a fifth transceiver unit, configured to:

notify another second network device, except a target network device for HO, in at least one candidate second network device that HO is canceled.

In the solution, the apparatus may further include a sixth transceiver unit, configured to receive capability information reported by a terminal, the capability information representing that the terminal supports CHO, and/or, send information indicating that a first network device supports CHO to the terminal and/or the second network device.

The embodiments of the application also provide a CHO-based processing apparatus, which may include a first configuration unit.

The first configuration unit may be configured to configure CHO information corresponding to each frequency for a terminal.

In the solution, the apparatus may further include a seventh transceiver unit, configured to:

receive capability information reported by the terminal, the capability information representing that the terminal supports CHO, and/or, send information indicating that a first network device supports CHO to the terminal.

The embodiments of the application also provide a CHO-based processing apparatus, which may include a first determination unit and a first HO unit.

The first determination unit may be configured to determine to execute HO, determine a cell for HO, and determine a random access resource using CHO configuration information corresponding to a frequency of the cell for HO.

The first HO unit may be configured to perform cell HO using the determined random access resource.

In the solution, the apparatus may further include an eighth transceiver unit, configured to:

report capability information to a first network device, the capability information representing that a terminal supports CHO, and/or, receive information indicating that the first network device supports CHO from the first network device.

The embodiments of the application also provide a CHO-based processing apparatus, which may include a second determination unit and an indication unit.

The second determination unit may be configured to determine information of invalid CHO configuration.

The indication unit may be configured to indicate the information of invalid CHO configuration to a terminal.

In the solution, the apparatus may further include a ninth transceiver unit, configured to:

receive capability information reported by the terminal, the capability information representing that the terminal supports CHO, and/or, send information indicating that a first network device supports CHO to the terminal.

The embodiments of the application also provide a CHO-based processing apparatus, which may include a tenth transceiver unit and an updating unit.

The tenth transceiver unit may be configured to receive information of invalid CHO configuration indicated by a first network device.

The updating unit may be configured to update information of local CHO configuration with the information of the indicated invalid CHO configuration.

In the solution, the tenth transceiver unit may be configured to:

report capability information to the first network device, the capability information representing that a terminal supports CHO, and/or, receive information indicating that the first network device supports CHO from the first network device.

The embodiments of the application also provide a CHO-based processing apparatus, which may include a second configuration unit and a third configuration unit.

The second configuration unit may be configured to configure CHO information for multiple candidate cells for a terminal.

The third configuration unit may be configured to configure priority information of the CHO information for the multiple candidate cells.

In the solution, the apparatus may further include an eleventh transceiver unit, configured to:

receive capability information reported by the terminal, the capability information representing that the terminal supports CHO, and/or, send information indicating that a first network device supports CHO to the terminal.

The embodiments of the application also provide a CHO-based processing apparatus, which may include a third determination unit and a second HO unit.

The third determination unit may be configured to determine to perform HO, and determine CHO information for a target cell according to configured priority information of CHO information for multiple candidate cells.

The second HO unit may be configured to perform cell HO using a dedicated random access resource corresponding to the CHO information for the target cell.

In the solution, the apparatus may further include a twelfth transceiver unit, configured to:
report capability information to a first network device, the capability information representing that a terminal supports CHO, and/or, receive information indicating that the first network device supports CHO from the first network device.

The embodiments of the application also provide a CHO-based processing apparatus, which may include a fourth configuration unit and a fifth configuration unit.

The fourth configuration unit may be configured to configure CHO information for a terminal.

The fifth configuration unit may be configured to configure a HO solution for access of the terminal to a target cell to be one of the following solutions:
a Make-before-break solution;
an enhanced Make-before-break solution;
a DAPS solution;
a RACH-less solution; and
a dual-connectivity-based solution.

In the solution, the apparatus may further include a thirteenth transceiver unit, configured to:
receive capability information reported by the terminal, the capability information representing that the terminal supports CHO, and/or, send information indicating that a first network device supports CHO to the terminal.

The embodiments of the application also provide a CHO-based processing apparatus, which may include a fourth determination unit and a third HO unit.

The fourth determination unit may be configured to determine a target cell for HO, and determine a HO solution for the target cell using configuration information of the HO solution for the target cell.

The third HO unit may be configured to perform cell HO using the determined HO solution, the configuration information representing that the HO solution for access of a terminal to the target cell is one of the following solutions:
a Make-before-break solution;
an enhanced Make-before-break solution;
a DAPS solution;
a RACH-less solution; and
a dual-connectivity-based solution.

In the solution, the apparatus may further include a fourteenth transceiver unit, configured to:
report capability information to a first network device, the capability information representing that the terminal supports CHO, and/or, receive information indicating that the first network device supports CHO from the first network device.

The embodiments of the application also provide a first network device, which may include a first processor and a first communication interface.

The first processor may be configured to execute, through the first communication interface, one of the following operations:

sending priority information to at least one candidate second network device for HO, the priority information being configured to indicate a priority at which the second network device serves a terminal;
configuring a cell-level dedicated random access resource for CHO;
configuring a condition for CHO for the terminal, and sending a first timer, after the first timer expires, the configured condition is invalid, and/or a dedicated random access resource, configured for CHO of the terminal, of the at least one candidate second network device may be released; and
after CHO is configured for the terminal, notifying the at least one candidate second network device for HO.

In the solution, the first communication interface may be configured to receive capability information reported by the terminal, the capability information representing that the terminal supports CHO, and/or, send information indicating that the first network device supports CHO to the terminal and/or the second network device.

The embodiments of the application also provide a terminal, which may include a second processor and a second communication interface.

The second processor may be configured to execute, based on configuration information of CHO through the second communication interface, one of the following operations:
determining to execute CHO, and performing CHO using a configured cell-level dedicated random access resource for CHO; and
after the configuration information of CHO is received, starting a first timer, here, after the first timer expires, a configured condition is invalid, and/or a random access resource, configured for CHO of the terminal, of at least one candidate second network device for HO may be released.

In the solution, the second communication interface may be configured to:
report capability information to a first network device, the capability information representing that the terminal supports CHO, and/or, receive information indicating that the first network device supports CHO from the first network device.

The embodiments of the application also provide a second network device, which may include a third processor and a third communication interface.

The third communication interface may be configured to, under the control of the third processor:
receive priority information sent by a first network device, the priority information being configured to indicate a priority at which the second network device serves a terminal;
or,
receive a notification that the first network device has configured CHO for the terminal, and start a second timer, wherein after the second timer expires, a dedicated random access resource allocated to the terminal could be released;
or,
configure, through the first network device, a first timer for the terminal, here, after the first timer expires, a dedicated random access resource, configured for CHO of the terminal, of the second network device could be released.

The first network device may presently provide service for the terminal. The second network device may be a candidate target network device for HO.

In the solution, the third communication interface may further be configured to:
receive information indicating that the first network device supports CHO from the first network device.

The embodiments of the application also provide a first network device, which may include a first processor and a first communication interface.

The first communication interface may be configured to notify, under the control of the first processor, another second network device, except a target network device for HO, in at least one candidate second network device that HO is canceled.

In the solution, the first communication interface may further be configured to:
receive capability information reported by a terminal, the capability information representing that the terminal supports CHO, and/or, send information indicating that the first network device supports CHO to the terminal and/or the second network device.

The embodiments of the application also provide a first network device, which may include a first processor and a first communication interface.

The first processor may be configured to configure, through the first communication interface, CHO information corresponding to each frequency for a terminal.

In the solution, the first communication interface may further be configured to:
receive capability information reported by the terminal, the capability information representing that the terminal supports CHO, and/or, send information indicating that the first network device supports CHO to the terminal and/or a second network device.

The embodiments of the application also provide a terminal, which may include a second processor and a second communication interface.

The second processor may be configured to determine to execute HO, determine a cell for HO, determine a random access resource using CHO configuration information corresponding to a frequency of the cell for HO, and perform, through the second communication interface, cell HO using the determined random access resource.

In the solution, the second communication interface may be configured to:
report capability information to a first network device, the capability information representing that the terminal supports CHO, and/or, receive information indicating that the first network device supports CHO from the first network device.

The embodiments of the application also provide a first network device, which may include a first processor and a first communication interface.

The first processor may be configured to determine information of invalid CHO configuration.

The first communication interface may be configured to indicate the information of invalid CHO configuration to a terminal.

In the solution, the first communication interface may further be configured to:
receive capability information reported by the terminal, the capability information representing that the terminal supports CHO, and/or, send information indicating that the first network device supports CHO to the terminal and/or a second network device.

The embodiments of the application also provide a terminal, which may include a second communication interface and a second processor.

The second communication interface may be configured to receive information of invalid CHO configuration indicated by a first network device.

The second processor may be configured to update information of local CHO configuration with the information of the indicated invalid CHO configuration.

In the solution, the second communication interface may further be configured to:
report capability information to the first network device, the capability information representing that the terminal supports CHO, and/or, receive information indicating that the first network device supports CHO from the first network device.

The embodiments of the application also provide a first network device, which may include a first processor and a first communication interface.

The first processor may be configured to, through the first communication interface, configure CHO information for multiple candidate cells for a terminal, and configure priority information of the CHO information for the multiple candidate cells.

In the solution, the first communication interface may be configured to:
receive capability information reported by the terminal, the capability information representing that the terminal supports CHO, and/or, send information indicating that the first network device supports CHO to the terminal and/or a second network device.

The embodiments of the application also provide a terminal, which may include a second processor and a second communication interface.

The second processor may be configured to determine to perform HO, determine CHO information for a target cell according to configured priority information of CHO information for multiple candidate cells, and perform, through the second communication interface, cell HO using a dedicated random access resource corresponding to the CHO information for the target cell.

In the solution, the second communication interface may be configured to:
report capability information to a first network device, the capability information representing that the terminal supports CHO, and/or, receive information indicating that the first network device supports CHO from the first network device.

The embodiments of the application also provide a first network device, which may include a first processor and a first communication interface.

The first processor may be configured to, through the first communication interface, configure CHO information for a terminal, and configure a HO solution for access of the terminal to a target cell to be one of the following solutions:
a Make-before-break solution;
an enhanced Make-before-break solution;
a DAPS solution;
a RACH-less solution; and
a dual-connectivity-based solution.

In the solution, the first communication interface may be configured to:
receive capability information reported by the terminal, the capability information representing that the terminal supports CHO, and/or, send information indicating that the first network device supports CHO to the terminal and/or a second network device.

The embodiments of the application also provide a terminal, which may include a second processor and a second communication interface.

The second processor may be configured to determine a target cell for HO, determine a HO solution for the target cell using configuration information of the HO solution for the target cell, and perform, through the second communication interface, cell HO using the determined HO solution, the configuration information representing that the HO solution for access of the terminal to the target cell is one of the following solutions:
- a Make-before-break solution;
- an enhanced Make-before-break solution;
- a DAPS solution;
- a RACH-less solution; and
- a dual-connectivity-based solution.

In the solution, the second communication interface may be configured to:
report capability information to a first network device, the capability information representing that the terminal supports CHO, and/or, receive information indicating that the first network device supports CHO from the first network device.

The embodiments of the application also provide a first network device, which may include a first processor and a first memory configured to store a computer program capable of running in the processor.

The first processor may be configured to run the computer program to execute the steps of any method for a first network device side.

The embodiments of the application also provide a terminal, which may include a second processor and a second memory configured to store a computer program capable of running in the processor.

The second processor may be configured to run the computer program to execute the steps of any method for a terminal side.

The embodiments of the application also provide a second network device, which may include a third processor and a third memory configured to store a computer program capable of running in the processor.

The third processor may be configured to run the computer program to execute the steps of any method for a second network device side.

The embodiments of the application also provide a storage medium having stored therein a computer program which is executed by a processor to implement the steps of any method for a first network device side, or implement the steps of any method for a terminal side, or implement the steps of any method for a second network device side.

According to the CHO-based processing method and apparatus, related device and storage medium provided in the embodiments of the application, the related problem in a CHO mechanism is solved, and a terminal and a network device may work normally.

DETAILED DESCRIPTION

The application will further be described below in combination with the drawings and embodiments in detail.

In a CHO mechanism, a source base station may configure CHO for multiple target cells for UE. In such case, the following problems need to be solved.
1: Multiple potential target cells may reserve dedicated random access resources in advance for the UE a period of time before HO is performed, so the dedicated resources are occupied for a relatively long time.
2: How does the source base station reduce a signaling overhead in a working process.
3: How does the source base station update a previous CHO configuration.
4: How should the UE work when receiving CHO configuration for multiple target cells.
5: When multiple pieces of UE request a cell for serving as a potential target cell, how to make an admission control decision.
6: When there are multiple HO solutions, how should the UE select the HO solution.

In the embodiments of the application, solutions are proposed for the foregoing problems. In the embodiments of the application, a first network device is a network device (which may be called a source base station) that presently provides service for a terminal, and correspondingly, a second network device is a candidate network device (which may be called a potential target base station) that the terminal is to be handed over to. Of course, the terminal may select a candidate network device from at least one candidate network device for HO as a target device for HO, and in such case, the selected second network device is called a candidate target network device for HO (which, in such case, may be called a target base station).

CHO refers to that, when channel quality between the terminal and a serving cell declines suddenly, and thus the terminal cannot complete HO normally, the source base station may configure that measurement reporting of the terminal is triggered at a relatively low threshold, the source base station contains a relatively high HO triggering threshold in a HO command, and once the HO threshold is satisfied, the terminal initiates a random access process to the target base station.

The second network device configures a UE-level dedicated random access resource for CHO or a cell-level dedicated random access resource for CHO for the terminal. That is, a dedicated resource may be the UE-level dedicated random access resource for CHO, or may be the cell-level dedicated random access resource for CHO.

Figure 2:
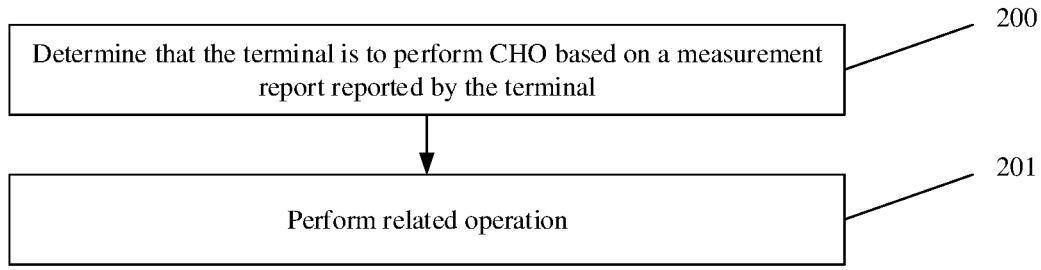
FIG. 2 is a flowchart of a CHO-based processing method for solving a problem that a dedicated resource is occupied for a relatively long time on a first network device side according to an embodiment of the application.

For problem 1, the embodiments of the application provide a CHO-based processing method, which is applied to a first network device, and as shown in FIG. 2, includes the following operations.

At block 200, a terminal is determined to perform CHO based on a measurement report reported by the terminal.

At block 201, a related operation is performed.

Specifically, the first network device executes one of the following operations.

A first operation is sending priority information to at least one candidate second network device for HO, the priority information being configured to indicate a priority at which the second network device serves the terminal.

In an example, the priority that the second network device serves the terminal includes a probability that the terminal will arrive at the second network device or a cell belonging to the second network device, i.e., a probability that the terminal will move to the second network device or the cell belonging to the second network device.

A second operation is configuring a cell-level dedicated random access resource for CHO.

A third operation is configuring a condition for CHO for the terminal, and sending a first timer. After the first timer expires, the configured condition is invalid, and/or a dedicated random access resource, configured for CHO of the terminal, of the at least one candidate second network device may be released.

A fourth operation is, after CHO is configured for the terminal, notifying the at least one candidate second network device for HO such that the candidate second network device determines a validity duration of the dedicated random access resource allocated to the terminal.

The first network device presently provides service for the terminal. That is, the first network device may be a base station that provides service for the terminal.

For the first operation, after the priority information is sent to the at least one candidate second network device for HO, when the candidate second network device determines, using the priority information, that the dedicated random access resource allocated to the terminal is required to be released, for example, when the priority is relatively low, the dedicated random access resource allocated to the terminal may be released. Since the second network device may release the dedicated resource allocated to the terminal when the priority is relatively low, the problem that the dedicated resource is occupied for a relatively long time is solved, and resource waste is avoided. In addition, the candidate second network device may further make an admission control decision using the priority information, for example, preferentially providing service for a terminal with a high priority, so that normal work may be ensured, and problem 5 is solved.

Here, in practical applications, the candidate second network device may determine, according to the priority information and in combination with other information (for example, a service priority corresponding to another terminal is relatively high), that the dedicated random access resource allocated to the terminal is required to be released.

In an embodiment, the operation that the priority information is sent to the at least one candidate second network device for HO includes the following operation.

Figure 1:
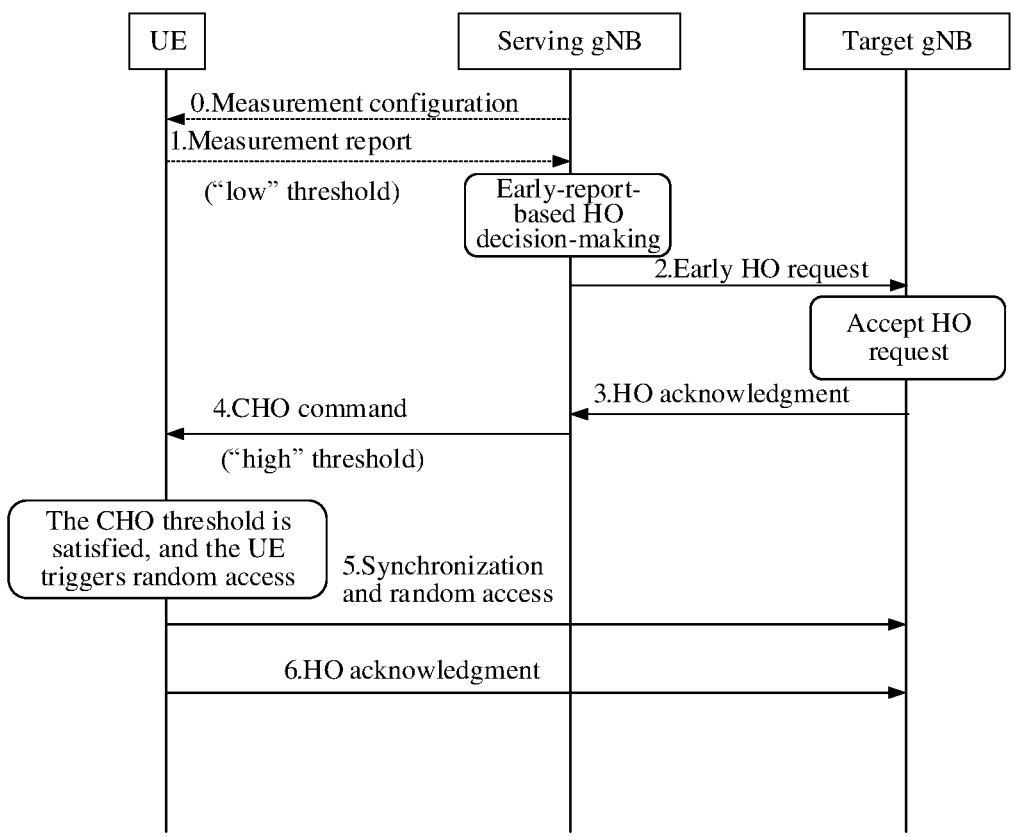
FIG. 1 is a flowchart of CHO according to the related art.

A HO request message (or a CHO request message, i.e., an early HO request in FIG. 1) is sent to the at least one candidate second network device, the HO request message containing the priority information.

Here, in practical applications, the priority information may also be sent after the first network device receives a HO command (a HO acknowledgment in FIG. 1) of the second network device.

In the second operation, when the cell-level dedicated random access resource for CHO is configured, the cell-level dedicated random access resource for CHO may be configured through system information, such as a System Information Block 1 (SIB1), for broadcasting.

The cell-level dedicated random access resource for CHO may include a preamble, a RA time-frequency resource position, and a RACH-less Uplink (UL) resource (configured for the terminal to send UL data), which are dedicated to CHO.

Here, since the cell-level dedicated random access resource for CHO is configured, and all terminals located in the same cell as the terminal may use the cell-level dedicated random access resource for CHO, a UE-level dedicated random access resource is not required to be configured for the terminal, namely the dedicated random access resource is not required to be reserved for the terminal. Therefore, the problem that the dedicated resource is occupied for a relatively long time is solved, and resource waste is avoided.

In the third operation, in practical applications, the first timer is configured by the first network device, or is configured by the candidate second network device. When the first timer is configured by the candidate second network device, the first network device transmits the configured first timer transparently to the terminal.

The first timer is configured, and after the timer expires, the configured condition is invalid, and/or the dedicated random access resource, configured for CHO of the terminal, of the at least one candidate second network device is probably released. Equivalently, the validity duration of the dedicated resource is configured, and the terminal cannot use the dedicated resource after the dedicated resource expires. Therefore, the problem that the dedicated resource is occupied for a relatively long time is solved, and resource waste is avoided.

In practical applications, the configured condition may be a condition corresponding to each frequency. Correspondingly, the configured condition may be an event that triggers HO (for example, quality of a neighbor cell is higher than a serving cell by a certain threshold), a threshold of Reference Signal Received Power (RSRP)/Reference Signal Received Quality (RSRQ)/Signal to Interference plus Noise Ratio (SINR), etc.

In the fourth operation, the first network device notifies the second network device that CHO configuration information has been sent to the terminal. The second network device, after receiving the notification, may start the timer, and after the timer expires, may release the dedicated resource, such as a RA resource, configured for the terminal. Equivalently, the validity duration of the dedicated resource is configured, and the terminal cannot use the dedicated resource after the dedicated resource expires. Therefore, the problem that the dedicated resource is occupied for a relatively long time is solved, and resource waste is avoided.

In practical applications, for ensuring that a CHO process may be performed between the terminal and the first network device, the terminal and the first network device may notify information indicating that they support CHO to each other.

Based thereon, in an embodiment, the method may further include the following operation.

Capability information reported by the terminal is received, the capability information representing that the terminal supports CHO.

Here, in practical applications, the terminal may send, for example, report through 1 bit indication information, the capability information to the first network device actively or after receiving a reporting requirement of a network side in an attach process.

In an embodiment, the method may further include the following operation.

Information indicating that the first network device supports CHO is sent to the terminal and/or the second network device.

Here, the information indicating that the first network device supports CHO may also be sent to the terminal and/or the second network device through 1 bit indication information, of course.

Correspondingly, the embodiments of the application also provide a CHO-based processing method, which is applied to the terminal and includes the following operations.

Based on configuration information of CHO, one of the following operations is performed.

CHO is determined to be performed, and CHO is performed using the configured cell-level dedicated random access resource for CHO.

After the configuration information of CHO is received, the first timer is started. After the first timer expires, the configured condition is invalid, and/or the random access resource, configured for CHO of the terminal, of the at least one candidate second network device for HO may be released.

As previously mentioned, the configuration information is configured by the first network device.

When the first network device executes the second operation, the terminal determines to execute CHO, and performs cell HO using the configured cell-level dedicated random access resource for CHO.

When the first network device executes the third operation, the terminal, after receiving the configuration information of CHO, starts the first timer. After the first timer expires, the configured condition is invalid, and/or the random access resource, configured for CHO of the terminal, of the at least one candidate second network device for HO may be released.

In an embodiment, the method may further include the following operation.

The cell-level dedicated random access resource configured for the terminal is received through system information.

In an embodiment, the method further includes the following operation.

The capability information is reported to the first network device, the capability information representing that the terminal supports CHO.

In an embodiment, the method may further include the following operation.

The information indicating that the first network device supports CHO is received from the first network device.

Correspondingly, the embodiments of the application also provide a CHO-based processing method, which is applied to the second network device and includes the following operations.

The priority information sent by the first network device is received, the priority information being configured to indicate the priority at which the second network device serves the terminal.

Or,
a notification that the first network device has configured CHO for the terminal is received, and a second timer is started, here, after the second timer expires, the dedicated random access resource allocated to the terminal may be released.

Or,
a first timer is configured for the terminal through the first network device, here, after the first timer expires, a dedicated random access resource, configured for CHO of the terminal, of the second network device may be released.

The first network device presently provides service for the terminal. The second network device is a candidate target network device for HO.

When the first network device executes the first operation, the second network device receives the priority information sent by the first network device to determine whether the dedicated random access resource allocated to the terminal is required to be released using the priority information.

When the first network device executes the fourth operation, the second network device receives the notification that the first network device has configured CHO for the terminal, and starts the second timer, here, after the second timer expires, the dedicated random access resource allocated to the terminal may be released.

Figure 3:
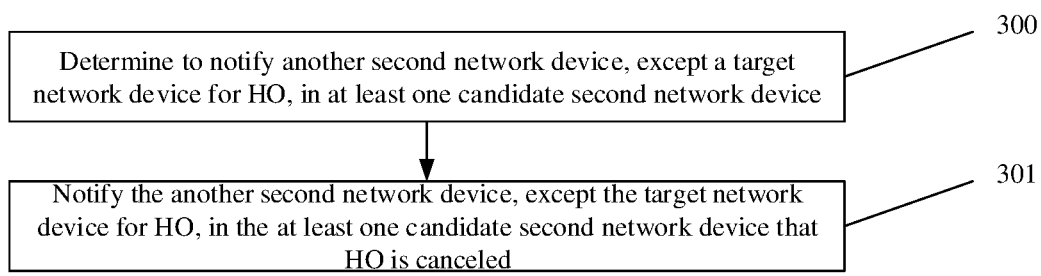
FIG. 3 is a flowchart of another CHO-based processing method for solving a problem that a dedicated resource is occupied for a relatively long time on a first network device side according to an embodiment of the application.

For problem 1, the embodiments of the application also provide a CHO-based processing method, which is applied to a first network device, and as shown in FIG. 3, includes the following operations.

At block 300, another second network device, except a target network device for HO, in at least one candidate second network device is determined to be notified.

Specifically, the first network device may determine to notify the another second network device in one of the following manners.

An immediate HO command is sent to a terminal.

A notification that HO to the target second network device succeeds or the terminal has initiated an access request to the target second network device is received.

ID information, notified by the terminal, of the target second network device for HO or a target cell is received.

An indication of information of invalid CHO configuration corresponding to the another second network device or cell is received from the terminal.

Here, that HO to the target second network device succeeds refers to that the terminal is successfully handed over to the target second network device.

In practical applications, the access request may be a random access request, or may be an RRC connection access request.

In practical applications, the terminal, before initiating a random access process to a certain cell, may report the identity information of the target second network device or the target cell to the first network device.

At block 301, the another second network device, except the target network device for HO, in the at least one candidate second network device is notified that HO is canceled.

Here, since the another second network device is notified that HO is canceled, the another second network device may release a dedicated resource allocated to the terminal. Therefore, the problem that the dedicated resource is occupied for a relatively long time is solved, and resource waste is avoided.

In practical applications, at block 301, when the another second network device is notified, a cell corresponding to which CHO is canceled or normal HO is canceled may also be notified to the another second network device.

In practical applications, for ensuring that a CHO process may be performed between the terminal and the first network device, the terminal and the first network device may notify information indicating that they support CHO to each other.

Based thereon, in an embodiment, the method may further include the following operation.

Capability information reported by the terminal is received, the capability information representing that the terminal supports CHO.

Here, in practical applications, the terminal may send, for example, report through 1 bit indication information, the capability information to the first network device actively or after receiving a reporting requirement of a network side in an attach process.

In an embodiment, the method may further include the following operation.

Information indicating that the first network device supports CHO is sent to the terminal and/or the second network device.

For problem 2, the embodiments of the application provide a CHO-based processing method, which is applied to a first network device and includes the following operation.

CHO information corresponding to each frequency is configured for a terminal.

That is, a HO condition is configured to be valid to all target cells of a certain configuration frequency.

In practical applications, the following configurations may be made: f1, conditional configuration1; f2, conditional configuration2; . . . .

The configured condition may be a HO triggering threshold of RSRP/RSRQ/SINR, etc.

The CHO information corresponding to each frequency is configured for the terminal. That is, the CHO information is applicable to all cells corresponding to the frequency, and there is no need to configure a piece of CHO information for each cell.

Therefore, a signaling overhead is greatly reduced.

In practical applications, for ensuring that a CHO process may be performed between the terminal and the first network device, the terminal and the first network device may notify information indicating that they support CHO to each other.

Based thereon, in an embodiment, the method may further include the following operation.

Capability information reported by the terminal is received, the capability information representing that the terminal supports CHO.

Here, in practical applications, the terminal may send, for example, report through 1 bit indication information, the capability information to the first network device actively or after receiving a reporting requirement of a network side in an attach process.

In an embodiment, the method may further include the following operation.

Information indicating that the first network device supports CHO is sent to the terminal and/or a second network device.

Here, the information indicating that the first network device supports CHO may also be sent to the terminal and/or the second network device through 1 bit indication information, of course.

Figure 4:
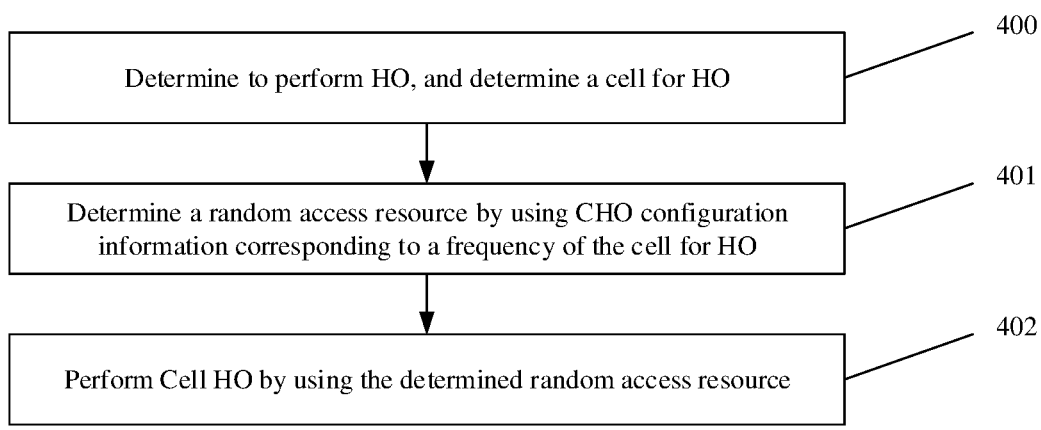
FIG. 4 is a flowchart of a CHO-based processing method for solving a problem of how to reduce a signaling overhead on a terminal side according to an embodiment of the application.

Correspondingly, the embodiments of the application also provide a CHO-based processing method, which is applied to the terminal, and as shown in FIG. 4, includes the following operations.

At block 400, HO is determined to be performed, and a cell for HO is determined.

At block 401, a random access resource is determined using CHO configuration information corresponding to a frequency of the cell for HO.

At block 402, cell HO is performed using the determined random access resource.

In an embodiment, the method may further include the following operation.

The capability information is reported to the first network device, the capability information representing that the terminal supports CHO.

In an embodiment, the method may further include the following operation.

The information indicating that the first network device supports CHO is received from the first network device.

Figure 5:
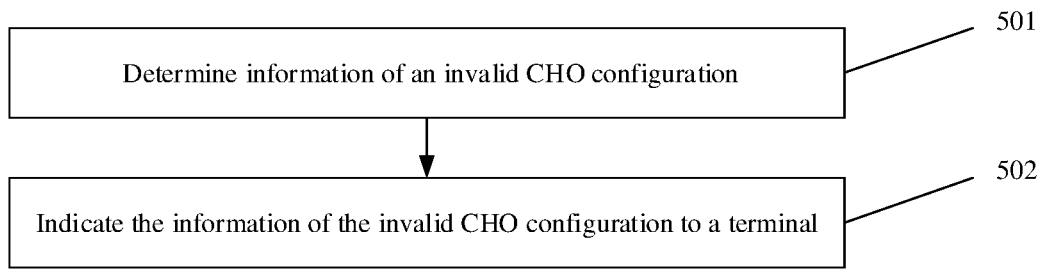
FIG. 5 is a flowchart of a CHO-based processing method for solving a problem of how to update a CHO configuration on a first network device side according to an embodiment of the application.

For problem 3, the embodiments of the application provide a CHO-based processing method, which is applied to a first network device, and as shown in FIG. 5, includes the following operations.

At block 501, information of invalid CHO configuration is determined.

Here, in practical applications, the information of invalid CHO configuration may be determined as required. For example, a terminal has performed cell HO, or the first network device sets a timer for the configured CHO configuration information, and it is determined that the corresponding CHO configuration information is invalid after the timer expires.

At block 502, the information of invalid CHO configuration is indicated to a terminal.

Specifically, the information of invalid CHO configuration is indicated to the terminal through an RRC reconfiguration message.

In an embodiment, an indication manner may include at least one of:

information of one or more invalid frequencies;
a related identity(ies) of an invalid cell(s) (e.g., removed cell(s)); or
a condition for some of CHO configuration becoming invalid.

Here, for the invalid condition, for example, a threshold value −5 dB of event A3 (Neighbor becomes offset better than SpCell) may be configured, and this means that, when quality of a certain neighbor cell is lower than a serving cell by 5 dB or above, the neighbor cell is no longer a potential target cell. The terminal, when measuring that a potential target cell is invalid, may further notify the first network device of a related identity of the target cell, so that the first network device indicates an invalid condition to the terminal. Of course, the first network device may further notify a target base station to release a corresponding dedicated resource.

Since the information of invalid CHO configuration is indicated to the terminal, the terminal may update previous CHO configuration information according to the indication.

In practical applications, for ensuring that a CHO process may be performed between the terminal and the first network device, the terminal and the first network device may notify information indicating that they support CHO to each other.

Based thereon, in an embodiment, the method may further include the following operation.

Capability information reported by the terminal is received, the capability information representing that the terminal supports CHO.

Here, in practical applications, the terminal may send, for example, report through 1 bit indication information, the capability information to the first network device actively or after receiving a reporting requirement of a network side in an attach process.

In an embodiment, the method may further include the following operation.

Information indicating that the first network device supports CHO is sent to the terminal.

Figure 6:
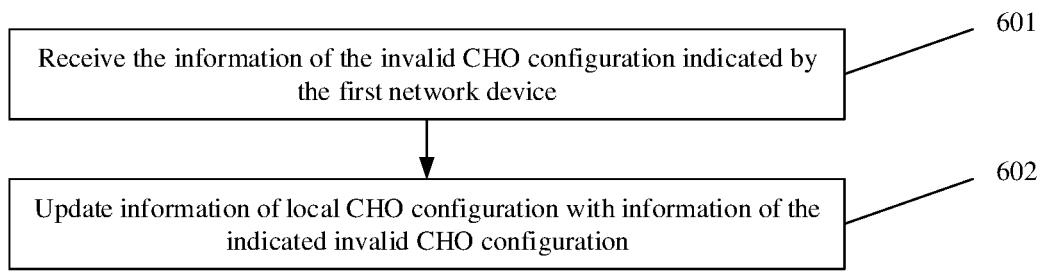
FIG. 6 is a flowchart of a CHO-based processing method for solving a problem of how to update a CHO configuration on a terminal side according to an embodiment of the application.

Correspondingly, the embodiments of the application also provide a CHO-based processing method, which is applied to the terminal, and as shown in FIG. 6, includes the following operations.

A block 601, the information of invalid CHO configuration indicated by the first network device is received.

Specifically, the information of invalid CHO configuration indicated by the first network device is received through the RRC reconfiguration message.

At block 602, information of local CHO configuration is updated with the information of the indicated invalid CHO configuration.

In an embodiment, the method may further include the following operation.

The capability information is reported to the first network device, the capability information representing that the terminal supports CHO.

In an embodiment, the method may further include the following operation.

The information indicating that the first network device supports CHO is received from the first network device.

Figure 7:
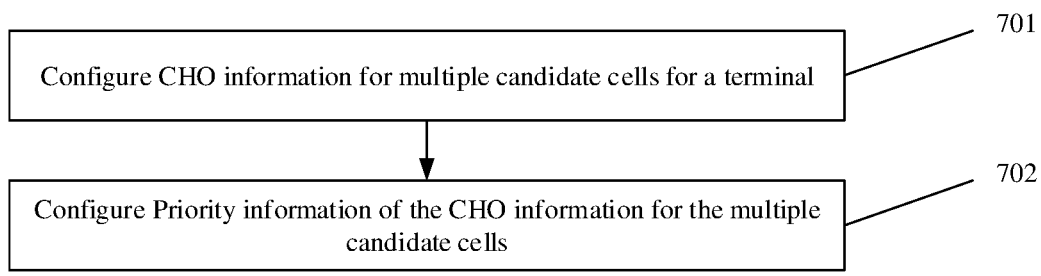
FIG. 7 is a flowchart of a CHO-based processing method for solving a problem of how to work when multiple CHOs are configured on a first network device side according to an embodiment of the application.

For problem 4, the embodiments of the application provide a CHO-based processing method, which is applied to a first network device, and as shown in FIG. 7, includes the following operations.

At block 701, CHO information for multiple candidate cells is configured for a terminal.

Here, in practical applications, the CHO information may be configured at one time or many times.

At block 702, priority information of the CHO information for the multiple candidate cells is configured.

Here, in practical applications, blocks 701 and 702 may be performed according to a random sequence.

The priority information of the CHO information for the multiple target cells may be reflected in a cell manner, namely each cell corresponds to a piece of priority information of CHO information. Alternatively, the priority information may be reflected in a frequency manner, namely all cells of the same frequency correspond to a piece of priority information.

Since the priority information of the CHO information for the multiple candidate cells is configured for the terminal, the terminal may determine CHO information for a target cell using the priority information, and further perform cell HO using a dedicated random access resource corresponding to the CHO information for the target cell. It is ensured that the terminal may determine the CHO information for the target cell, and further work normally.

Furthermore, the terminal, when not successfully accessing a potential target cell (i.e., a candidate cell) with the highest priority, may try to access subsequent potential target cells according to a sequence of priorities.

In an embodiment, the first network device may configure the priority information implicitly or explicitly. For implicit configuration, for example, the multiple candidate cells may be sequenced, and a sequencing result indicates the priorities of the multiple candidate cells. For example, related information of cell IDs, RA resources, etc., of the target cells is arranged according to a sequence from high to low or from low to high priorities.

For explicit configuration, the priority information of the CHO information for the multiple candidate cells may be transmitted directly to the terminal.

In practical applications, for ensuring that a CHO process may be performed between the terminal and the first network device, the terminal and the first network device may notify information indicating that they support CHO to each other.

Based thereon, in an embodiment, the method may further include the following operation.

Capability information reported by the terminal is received, the capability information representing that the terminal supports CHO.

Here, in practical applications, the terminal may send, for example, report through 1 bit indication information, the capability information to the first network device actively or after receiving a reporting requirement of a network side in an attach process.

In an embodiment, the method may further include the following operation.

Information indicating that the first network device supports CHO is sent to the terminal.

Here, the information indicating that the first network device supports CHO may also be sent to the terminal through 1 bit indication information, of course.

Figure 8:
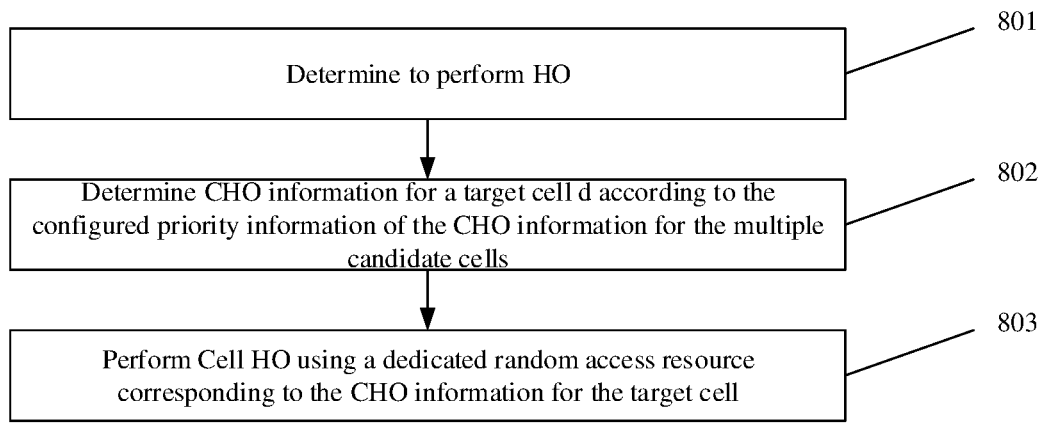
FIG. 8 is a flowchart of a CHO-based processing method for solving a problem of how a terminal works when multiple CHOs are configured on a terminal side according to an embodiment of the application.

Correspondingly, the embodiments of the application also provide a CHO-based processing method, which is applied to the terminal, and as shown in FIG. 8, includes the following operations.

At block 801, HO is determined to be performed.

At block 802, CHO information for a target cell is determined according to the configured priority information of the CHO information for the multiple candidate cells.

At block 803, cell HO is performed using a dedicated random access resource corresponding to the CHO information for the target cell.

In an embodiment, the method may further include the following operation.

The capability information is reported to the first network device, the capability information representing that the terminal supports CHO.

In an embodiment, the method may further include the following operation.

The information indicating that the first network device supports CHO is received from the first network device.

Figure 9:
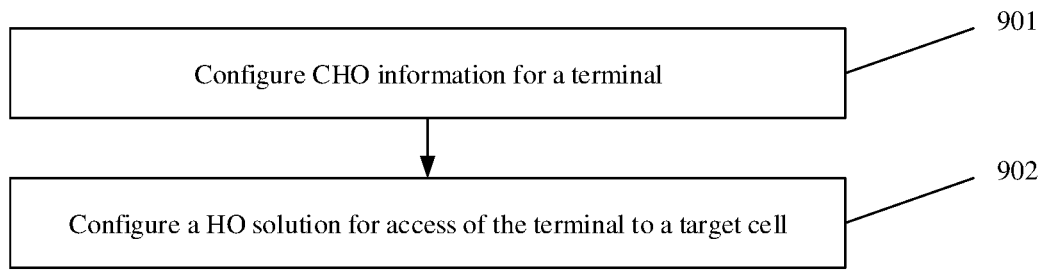
FIG. 9 is a flowchart of a CHO-based processing method for solving a problem of how a terminal selects a HO solution when there are multiple CHO solutions on a first network device side according to an embodiment of the application.

For problem 6, the embodiments of the application provide a CHO-based processing method, which is applied to a first network device, and as shown in FIG. 9, includes the following operations.

At block 901, CHO information is configured for a terminal.

Here, when a HO solution for access of the terminal to a target cell is configured, the first network device receives a HO solution sent by a second network device corresponding to the target cell.

The HO solution for access of the terminal to the target cell is configured using the received HO solution.

Of course, the first network device may also directly configure the HO solution without considering the HO solution for the target cell.

Here, in practical applications, the first network device may obtain the HO solution corresponding to the target cell from HO acknowledgment information sent by the second network device corresponding to the target cell.

At block 902, a HO solution for access of the terminal to a target cell is configured.

Specifically, the HO solution for access of the terminal to the target cell is configured to be one of the following solutions:

a Make-before-break solution;
an enhanced Make-before-break solution;
a DAPS solution;
a RACH-less solution; and
a dual-connectivity-based solution.

A basic idea of the Make-before-break solution is that the terminal, at the same time of accessing the target base station, is kept connected with the source base station, and keeps data communication with the source base station.

A basic idea of the enhanced Make-before-break solution is that two-transmit two-receive or single-transmit two-receive or two-transmit one-receive of the terminal is supported based on the Make-before-break solution, thereby reducing a user-plane interruption delay, for example, reducing from 5 ms to approximately 0 ms.

A basic idea of the DAPS solution is that the terminal simultaneously activates two sets of protocol stacks for communication with the source base station and the target base station, thereby reducing the user-plane interruption delay.

A basic idea of the RACH-less solution is that the terminal does not need to initiate a random access process to the target base station, and directly work using information configured by the target base station in a HO process.

A basic idea of the dual-connectivity-based solution is that, in the HO process, the target base station is added as a secondary station at first, then roles of primary and secondary stations are interchanged, namely the target base station becomes a new primary station, and the source base station becomes a new secondary station, and finally, the source base station is disconnected from the terminal in form of deleting the secondary station.

Here, all the configured HO solutions are solutions for reducing the user-plane delay in the HO process.

Since the HO solution is configured for the terminal, the terminal may determine the HO solution to be used, and normal work of the terminal is ensured.

In practical applications, for ensuring that a CHO process may be performed between the terminal and the first network device, the terminal and the first network device may notify information indicating that they support CHO to each other.

Based thereon, in an embodiment, the method may further include the following operation.

Capability information reported by the terminal is received, the capability information representing that the terminal supports CHO.

Here, in practical applications, the terminal may send, for example, report through 1 bit indication information, the capability information to the first network device actively or after receiving a reporting requirement of a network side in an attach process.

In an embodiment, the method may further include the following operation.

Information indicating that the first network device supports CHO is sent to the terminal.

Here, the information indicating that the first network device supports CHO may also be sent to the terminal and/or the second network device through 1 bit indication information, of course.

Figure 10:
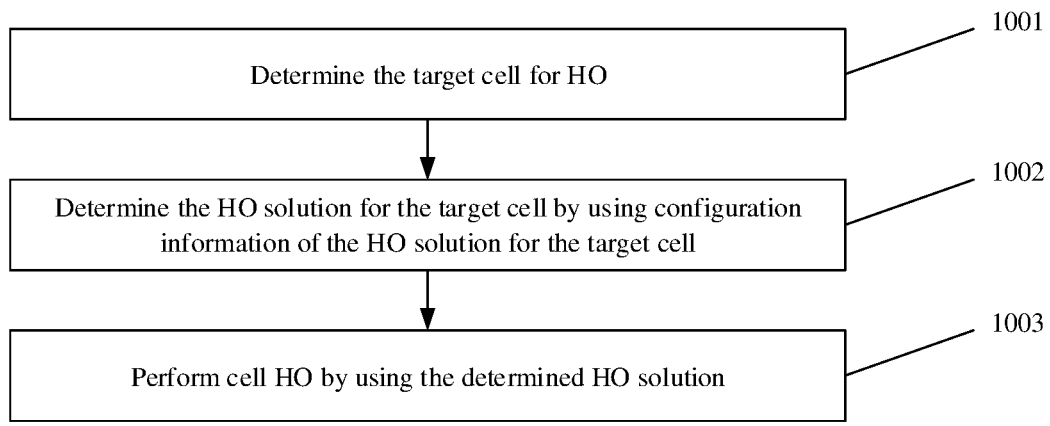
FIG. 10 is a flowchart of a CHO-based processing method for solving a problem of how a terminal selects a HO solution when there are multiple CHO solutions on a terminal side according to an embodiment of the application.

Correspondingly, the embodiments of the application also provide a CHO-based processing method, which is applied to the terminal, and as shown in FIG. 10, includes the following operations.

At block 1001, the target cell for HO is determined.

At block 1002, the HO solution for the target cell is determined using configuration information of the HO solution for the target cell.

At block 1003, cell HO is performed using the determined HO solution, the configuration information representing that the HO solution for access of the terminal to the target cell is one of the following solutions:

the Make-before-break solution;
the enhanced Make-before-break solution;
the DAPS solution;
the RACH-less solution; and
the dual-connectivity-based solution.

In an embodiment, the method may further include the following operation.

The capability information is reported to the first network device, the capability information representing that the terminal supports CHO.

In an embodiment, the method may further include the following operation.

The information indicating that the first network device supports CHO is received from the first network device.

Figure 11:
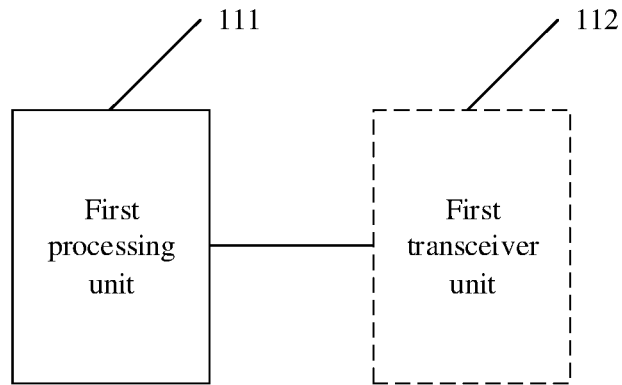
FIG. 11 is a structure diagram of a CHO-based processing apparatus for solving a problem that a dedicated resource is occupied for a relatively long time according to an embodiment of the application.

For implementing the solutions solving problem 1 and problem 5, the embodiments of the application also provide a CHO-based processing apparatus, which is arranged at a first network device, and as shown in FIG. 11, includes a first processing unit 111, configured to execute one of the following operations:

sending priority information to at least one candidate second network device for HO, the priority information being configured to indicate a priority at which the second network device serves a terminal;

configuring a cell-level dedicated random access resource for CHO;

configuring a condition for CHO for the terminal, and sending a first timer, herein, after the first timer expires, the configured condition is invalid, and/or a dedicated random access resource, configured for CHO of the terminal, of the at least one candidate second network device could be released; and after CHO is configured for the terminal, notifying the at least one candidate second network device for HO such that the candidate second network device determines a validity duration of the dedicated random access resource allocated to the terminal.

The first processing unit 111 determines the terminal to perform CHO based on a measurement report reported by the terminal, thereby executing the related operations.

In an embodiment, as shown in FIG. 11, the apparatus further includes a first transceiver unit 112, configured to:

receive capability information reported by the terminal, the capability information representing that the terminal supports CHO, and/or, send information indicating that the first network device supports CHO to the terminal and/or the second network device, the first network device presently providing service for the terminal.

In practical applications, the first processing unit 111 may be implemented by a processor in the CHO-based processing apparatus in combination with a communication interface, and the first transceiver unit 112 may be implemented by the communication interface in the CHO-based processing apparatus.

Figure 12:
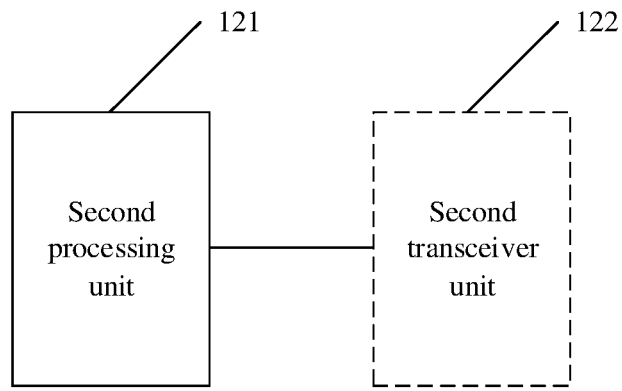
FIG. 12 is a structure diagram of another CHO-based processing apparatus for solving a problem that a dedicated resource is occupied for a relatively long time according to an embodiment of the application.

Correspondingly, the embodiments of the application also provide a CHO-based processing apparatus, which is arranged at the terminal, and as shown in FIG. 12, includes a second processing unit 121, configured to, based on configuration information of CHO, execute one of the following operations:

determining to execute CHO, and performing CHO using the configured cell-level dedicated random access resource for CHO; and after the configuration information of CHO is received, starting the first timer, here, after the first timer expires, the configured condition is invalid, and/or the random access resource, configured for CHO of the terminal, of the at least one candidate second network device for HO could be released.

In an embodiment, as shown in FIG. 12, the apparatus may further include a second transceiver unit 122, configured to:

report the capability information to the first network device, the capability information representing that the terminal supports CHO, and/or, receive the information indicating that the first network device supports CHO from the first network device.

In practical applications, the second processing unit 121 may be implemented by a processor in the CHO-based processing apparatus in combination with a communication interface, and the second transceiver unit 122 may be implemented by the communication interface in the CHO-based processing apparatus.

Figure 13:
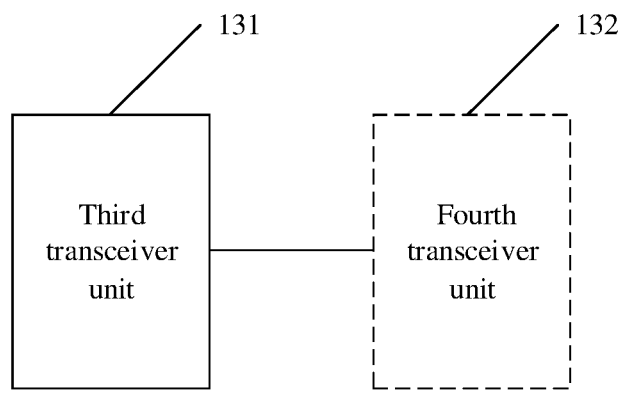
FIG. 13 is a structure diagram of a third CHO-based processing apparatus for solving a problem that a dedicated resource is occupied for a relatively long time according to an embodiment of the application.

Correspondingly, the embodiments of the application provide a CHO processing apparatus, which is arranged at the second network device, and as shown in FIG. 13, includes a third transceiver unit 131, configured to:

receive the priority information sent by the first network device, the priority information being configured to indicate the priority at which the second network device serves the terminal;

or, receive a notification that the first network device has configured CHO for the terminal, and start a second timer, after the second timer expires, the dedicated random access resource allocated to the terminal could be released;

or, configure the first timer for the terminal through the first network device, after the first timer expires, the dedicated random access resource, configured for CHO of the terminal, of the second network device could be released.

The first network device presently provides service for the terminal. The second network device is a candidate target network device for HO.

In an embodiment, as shown in FIG. 13, the apparatus may further include a fourth transceiver unit 132, configured to receive the information indicating that the first network device supports CHO from the first network device.

In practical applications, the third transceiver unit 131 and the fourth transceiver unit 132 may be implemented by a processor in the CHO-based processing apparatus in combination with a communication interface.

Figure 14:
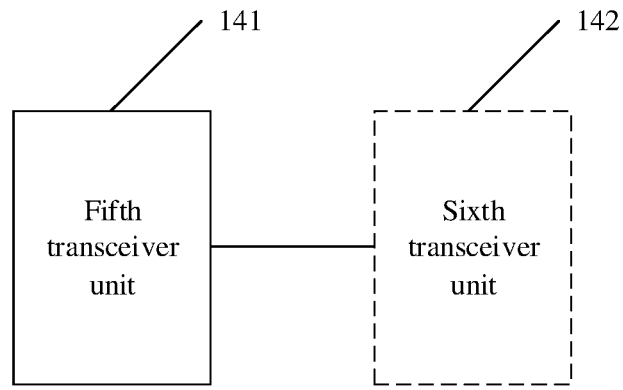
FIG. 14 is a structure diagram of a fourth CHO-based processing apparatus for solving a problem that a dedicated resource is occupied for a relatively long time according to an embodiment of the application.

For implementing the solution solving problem 1, the embodiments of the application also provide a CHO-based processing apparatus, which is arranged at a first network device, and as shown in FIG. 14, includes a fifth transceiver unit 141, configured to:

notify another second network device, except a target network device for HO, in at least one candidate second network device that HO is canceled.

In an embodiment, as shown in FIG. 14, the apparatus may further include a sixth transceiver unit 142, configured to receive capability information reported by a terminal, the capability information representing that the terminal supports CHO, and/or, send information indicating that the first network device supports CHO to the terminal and/or the second network device.

In an embodiment, the fifth transceiver unit 141 may determine to notify the another second network device in one of the following manners:

sending an immediate HO command to the terminal;
receiving a notification that HO to the target second network device succeeds or the terminal has initiated an access request to the target second network device;
receiving identity information, notified by the terminal, of the target second network device for HO or a target cell; and
receiving an indication of information of invalid CHO configuration corresponding to the another second network device or cell from the terminal.

In practical applications, the fifth transceiver unit 141 and the sixth transceiver unit 142 may be implemented by a processor in the CHO-based processing apparatus in combination with a communication interface.

Figure 15:
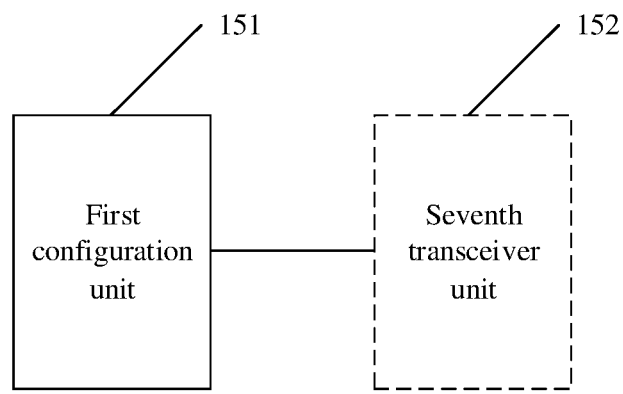
FIG. 15 is a structure diagram of a CHO-based processing apparatus for solving a problem of how to reduce a signaling overhead according to an embodiment of the application.

For implementing the solutions solving problem 2, the embodiments of the application also provide a CHO-based processing apparatus, which is arranged at a first network device, and as shown in FIG. 15, includes a first configuration unit 151.

The first configuration unit 151 is configured to configure CHO information corresponding to each frequency for a terminal.

In an embodiment, as shown in FIG. 15, the apparatus further includes a seventh transceiver unit 152, configured to:
receive capability information reported by the terminal, the capability information representing that the terminal supports CHO, and/or, send information indicating that the first network device supports CHO to the terminal.

In practical applications, the first configuration unit 151 and the seventh transceiver unit 152 may be implemented by a processor in the CHO-based processing apparatus in combination with a communication interface.

Figure 16:
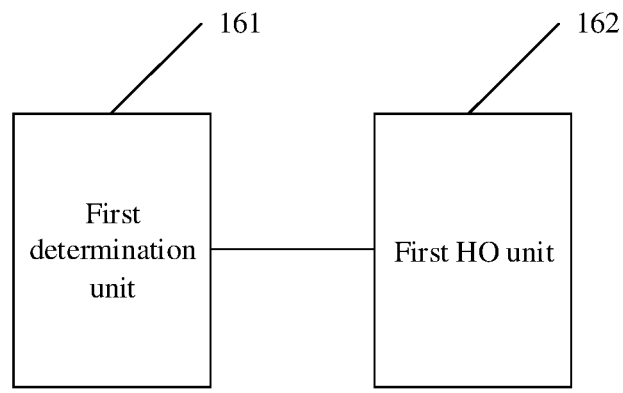
FIG. 16 is a structure diagram of another CHO-based processing apparatus for solving a problem of how to reduce a signaling overhead according to an embodiment of the application.

Correspondingly, the embodiments of the application also provide a CHO-based processing apparatus, which is arranged at the terminal, and as shown in FIG. 16, includes a first determination unit 161 and a first HO unit 162.

The first determination unit 161 is configured to determine to execute HO, determine a cell for HO, and determine a random access resource using CHO configuration information corresponding to a frequency of the cell for HO.

The first HO unit 162 is configured to perform cell HO using the determined random access resource.

In an embodiment, the apparatus may further include an eighth transceiver unit, configured to:
report the capability information to the first network device, the capability information representing that the terminal supports CHO, and/or, receive the information indicating that the first network device supports CHO from the first network device.

In practical applications, the first determination unit 161 may be implemented by a processor in the CHO-based processing apparatus, and the first HO unit 162 and the eighth transceiver unit may be implemented by the processor in the CHO-based processing apparatus in combination with a communication interface.

Figure 17:
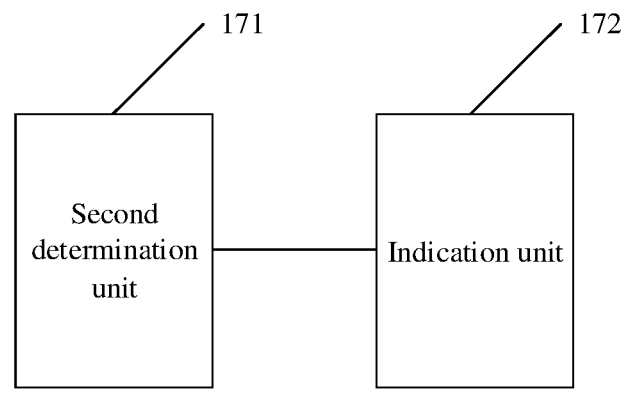
FIG. 17 is a structure diagram of a CHO-based processing apparatus for solving a problem of how to update a CHO configuration according to an embodiment of the application.

For implementing the solutions solving problem 3, the embodiments of the application also provide a CHO-based processing apparatus, which is arranged at a first network device, and as shown in FIG. 17, includes a second determination unit 171 and an indication unit 172.

The second determination unit 171 is configured to determine information of invalid CHO configuration.

The indication unit 172 is configured to indicate the information of invalid CHO configuration to a terminal.

In an embodiment, the apparatus further includes a ninth transceiver unit, configured to:
receive capability information reported by the terminal, the capability information representing that the terminal supports CHO, and/or, send information indicating that the first network device supports CHO to the terminal.

In practical applications, the second determination unit 171 may be implemented by a processor in the CHO-based processing apparatus, and the indication unit 172 and the ninth transceiver unit may be implemented by the processor in the CHO-based processing apparatus in combination with a communication interface.

Figure 18:
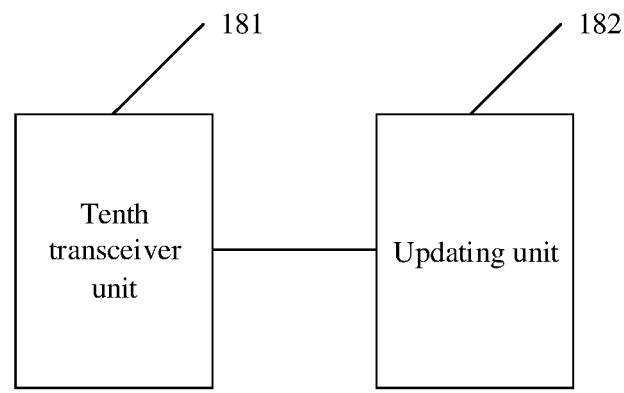
FIG. 18 is a structure diagram of another CHO-based processing apparatus for solving a problem of how to update a CHO configuration according to an embodiment of the application.

Correspondingly, the embodiments of the application also provide a CHO-based processing apparatus, which is arranged at the terminal, and as shown in FIG. 18, includes a tenth transceiver unit 181 and an updating unit 182.

The tenth transceiver unit 181 is configured to receive the information of invalid CHO configuration indicated by the first network device.

The updating unit 182 is configured to update information of local CHO configuration with the information of the indicated invalid CHO configuration.

In an embodiment, the tenth transceiver unit is configured to:
report the capability information to the first network device, the capability information representing that a terminal supports CHO, and/or, receive the information indicating that the first network device supports CHO from the first network device.

In practical applications, the updating unit 182 may be implemented by a processor in the CHO-based processing apparatus, and the tenth transceiver unit 181 may be implemented by the processor in the CHO-based processing apparatus in combination with a communication interface.

Figure 19:
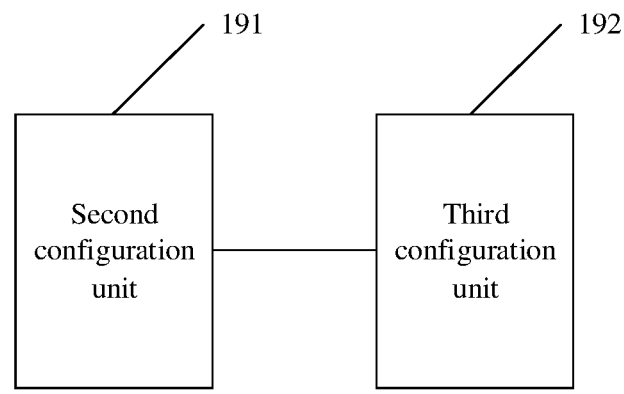
FIG. 19 is a structure diagram of a CHO-based processing apparatus for solving a problem of how to work when multiple CHOs are configured according to an embodiment of the application.

For implementing the solutions solving problem 4, the embodiments of the application also provide a CHO-based processing apparatus, which is arranged at a first network device, and as shown in FIG. 19, includes a second configuration unit 191 and a third configuration unit 192.

The second configuration unit 191 is configured to configure CHO information for multiple candidate cells for a terminal.

The third configuration unit 192 is configured to configure priority information of the CHO information for the multiple candidate cells.

In an embodiment, the apparatus may further include an eleventh transceiver unit, configured to:
receive capability information reported by the terminal, the capability information representing that the terminal supports CHO, and/or, send information indicating that the first network device supports CHO to the terminal.

In practical applications, the second configuration unit 191, the third configuration unit 192 and the eleventh transceiver unit may be implemented by a processor in the CHO-based processing apparatus in combination with a communication interface.

Figure 20:
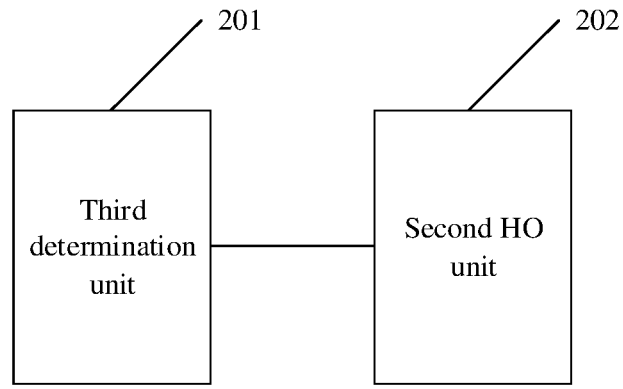
FIG. 20 is a structure diagram of another CHO-based processing apparatus for solving a problem of how to work when multiple CHOs are configured according to an embodiment of the application.

Correspondingly, the embodiments of the application also provide a CHO-based processing apparatus, which is arranged at the terminal, and as shown in FIG. 20, includes a third determination unit 201 and a second HO unit 202.

The third determination unit 201 is configured to determine to perform HO, and determine CHO information for a target cell according to the configured priority information of the CHO information for the multiple candidate cells.

The second HO unit 202 is configured to perform cell HO using a dedicated random access resource corresponding to the CHO information for the target cell.

In an embodiment, the apparatus may further include a twelfth transceiver unit, configured to:
 report the capability information to the first network device, the capability information representing that the terminal supports CHO, and/or, receive the information indicating that the first network device supports CHO from the first network device.

In practical applications, the third determination unit 201 may be implemented by a processor in the CHO-based processing apparatus, and the second HO unit 202 and the twelfth transceiver unit may be implemented by the processor in the CHO-based processing apparatus in combination with a communication interface.

Figure 21:
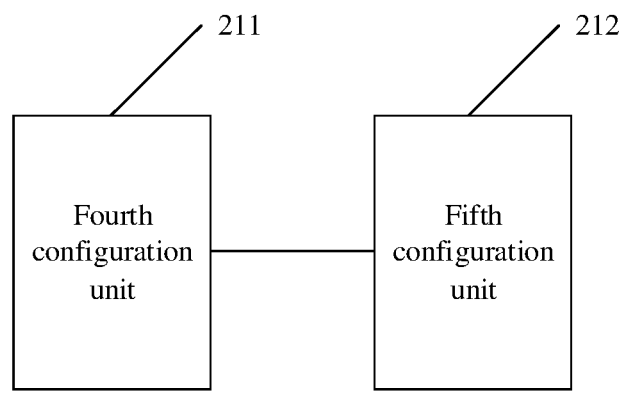
FIG. 21 is a structure diagram of a CHO-based processing apparatus for solving a problem of how a terminal selects a HO solution when there are multiple CHO solutions according to an embodiment of the application.

For implementing the solutions solving problem 6, the embodiments of the application also provide a CHO-based processing apparatus, which is arranged at a first network device, and as shown in FIG. 21, includes a fourth configuration unit 211 and a fifth configuration unit 212.

The fourth configuration unit 211 is configured to configure CHO information for a terminal.

The fifth configuration unit 212 is configured to configure a HO solution for access of the terminal to a target cell to be one of the following solutions:
 a Make-before-break solution;
 an enhanced Make-before-break solution;
 a DAPS solution;
 a RACH-less solution; and
 a dual-connectivity-based solution.

In an embodiment, the apparatus may further include a thirteenth transceiver unit, configured to:
 receive capability information reported by the terminal, the capability information representing that the terminal supports CHO, and/or, send information indicating that the first network device supports CHO to the terminal.

In practical applications, the fourth configuration unit 211, the fifth configuration unit 212 and the thirteenth transceiver unit may be implemented by a processor in the CHO-based processing apparatus in combination with a communication interface.

Figure 22:
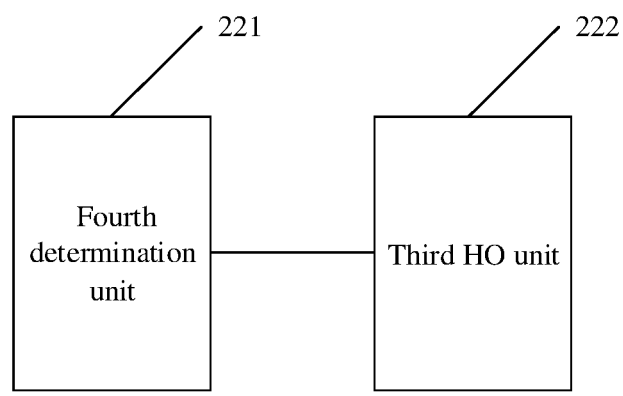
FIG. 22 is a structure diagram of another CHO-based processing apparatus for solving a problem of how a terminal selects a HO solution when there are multiple CHO solutions according to an embodiment of the application.

Correspondingly, the embodiments of the application also provide a CHO-based processing apparatus, which is arranged at the terminal, and as shown in FIG. 22, includes a fourth determination unit 221 and a third HO unit 222.

The fourth determination unit 221 is configured to determine the target cell for HO, and determine the HO solution for the target cell using configuration information of the HO solution for the target cell.

The third HO unit 222 is configured to perform cell HO using the determined HO solution, the configuration information representing that the HO solution for access of the terminal to the target cell is one of the following solutions:
 the Make-before-break solution;
 the enhanced Make-before-break solution;
 the DAPS solution;
 the RACH-less solution; and
 the dual-connectivity-based solution.

In an embodiment, the apparatus may further include a fourteenth transceiver unit, configured to:
 report the capability information to the first network device, the capability information representing that the terminal supports CHO, and/or, receive the information indicating that the first network device supports CHO from the first network device.

In practical applications, the fourth determination unit 221 may be implemented by a processor in the CHO-based processing apparatus, and the third HO unit 222 and the fourteenth transceiver unit may be implemented by the processor in the CHO-based processing apparatus in combination with a communication interface.

It is to be noted that the CHO-based processing apparatus provided in the embodiments is described with division of each of the abovementioned program modules as an example during CHO-based processing, and during the practical application, such processing may be allocated to different program modules for completion as required. That is, an internal structure of the apparatus is divided into different program modules to complete all or part of abovementioned processing. In addition, the CHO-based processing apparatus provided in the embodiments belongs to the same concept of the CHO-based processing method embodiments, and details about a specific implementation process thereof refer to the method embodiments, and will not be elaborated herein.

Figure 23:
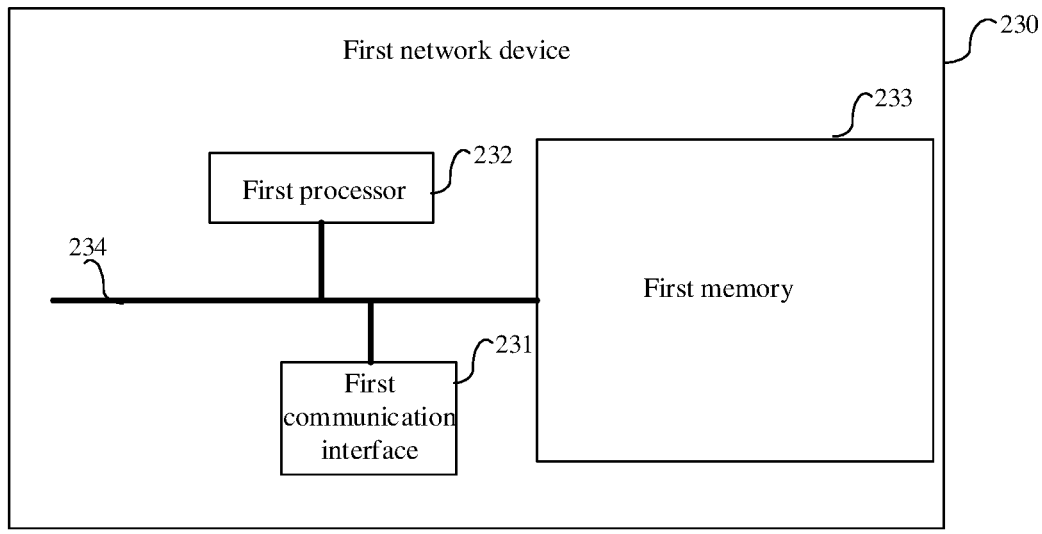
FIG. 23 is a structure diagram of a first network device according to an embodiment of the application.

Based on hardware implementation of each program module, for implementing the method for a first network device side in the embodiments of the application, the embodiments of the application also provide a first network device. As shown in FIG. 23, the first network device 230 includes a first communication interface 231 and a first processor 232.

The first communication interface 231 may perform information interaction with another device.

The first processor 232 is connected with the first communication interface 231 to implement information interaction with the other device, and is configured to run a computer program to execute the method provided in one or more technical solutions for the first network device side. The computer program is stored in a first memory 233.

Of course, in practical applications, each component in the first network device 230 is coupled through a bus system 234. It can be understood that the bus system 234 is configured to implement connection communication between these components. The bus system 234 includes a data bus, and further includes a power bus, a control bus, and a state signal bus. However, for clear description, various buses in FIG. 23 are marked as the bus system 234.

In the embodiments of the application, the first memory 233 is configured to store various types of data to support the operations of the first network device 230. Examples of the data include any computer program operated in the first network device 230.

The method disclosed in the embodiments of the application may be applied to the first processor 232 or implemented by the first processor 232. The first processor 232 may be an integrated circuit chip with a signal processing capability. In an implementation process, each step of the method may be completed by an integrated logic circuit in a hardware form in the first processor 232 or an instruction in a software form. The first processor 232 may be a universal processor, a Digital Signal Processor (DSP) or another Programmable Logic Device (PLD), a discrete gate or transistor logic device, a discrete hardware component, etc. The first processor 232 may implement or execute each method, step, and logical block diagram disclosed in the embodiments of the application. The universal processor may be a microprocessor, any conventional processor or the like. The steps of the method disclosed in combination with the embodiments of the application may be directly embodied to be performed and completed by a hardware decoding processor or performed and completed by a combination of hardware and software modules in the decoding processor. The software module may be in a storage medium, and the storage medium is in the first memory 233. The first processor 232 reads information in the first memory 233, and completes the steps of the method in combination with hardware.

In an exemplary embodiment, the first network device 230 may be implemented by one or more Application Specific Integrated Circuits (ASICs), DSPs, PLDs, Complex Programmable Logic Devices (CPLDs), Field-Programmable Gate Arrays (FPGAs), universal processors, controllers, Micro Controller Units (MCUs), microprocessors, or other electronic components, and is configured to execute the abovementioned method.

Figure 24:
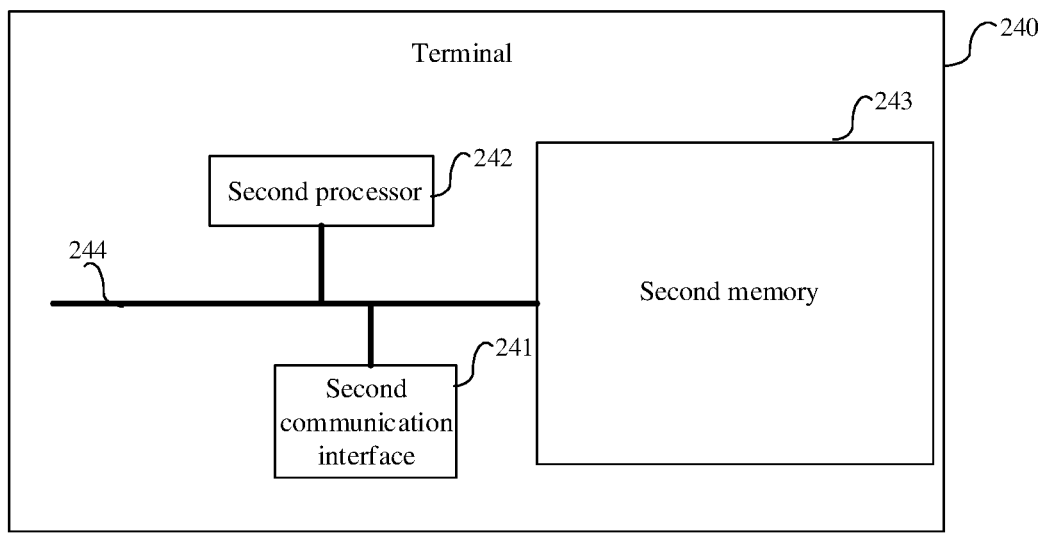
FIG. 24 is a structure diagram of a terminal according to an embodiment of the application.

Based on hardware implementation of the program modules, for implementing the method for the terminal side in the embodiments of the application, the embodiments of the application also provide a terminal. As shown in FIG. 24, the terminal 240 includes a second communication interface 241 and a second processor 242.

The second communication interface 241 may perform information interaction with a network device.

The second processor 242 is connected with the second communication interface 241 to implement information interaction with the network device, and is configured to run a computer program to execute the method provided in one or more technical solutions for the terminal side. The computer program is stored in a second memory 243.

Of course, in practical applications, each component in the terminal 240 is coupled through a bus system 244. It can be understood that the bus system 244 is configured to implement connection communication between these components. The bus system 244 includes a data bus, and further includes a power bus, a control bus, and a state signal bus. However, for clear description, various buses in FIG. 24 are marked as the bus system 244.

In the embodiment of the application, the second memory 243 is configured to store various types of data to support the operations of the terminal 240. Examples of the data include any computer program operated in the terminal 240.

The method disclosed in the embodiments of the application may be applied to the second processor 242 or implemented by the second processor 242. The second processor 242 may be an integrated circuit chip with a signal processing capability. In an implementation process, each step of the method may be completed by an integrated logic circuit in a hardware form in the second processor 242 or an instruction in a software form. The second processor 242 may be a universal processor, a DSP or another PLD, a discrete gate or transistor logic device, a discrete hardware component, etc. The second processor 242 may implement or execute each method, step, and logical block diagram disclosed in the embodiments of the application. The universal processor may be a microprocessor, any conventional processor or the like. The steps of the method disclosed in combination with the embodiments of the application may be directly embodied to be performed and completed by a hardware decoding processor or performed and completed by a combination of hardware and software modules in the decoding processor. The software module may be in a storage medium, and the storage medium is in the second memory 243. The second processor 242 reads information in the second memory 243, and completes the steps of the method in combination with hardware.

In an exemplary embodiment, the terminal 240 may be implemented by one or more ASICs, DSPs, PLDs, CPLDs, FPGAs, universal processors, controllers, MCUs, microprocessors, or other electronic components, and is configured to execute the abovementioned method.

Figure 25:
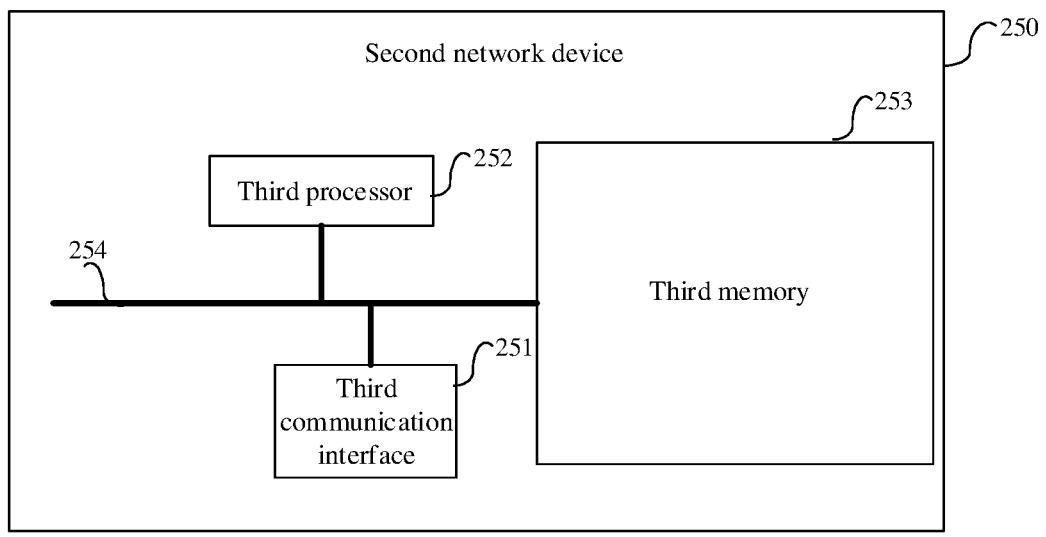
FIG. 25 is a structure diagram of a second network device according to an embodiment of the application.

Based on hardware implementation of each program module, for implementing the method for a second network device side in the embodiments of the application, as shown in FIG. 25, a second network device 250 includes a third communication interface 251 and a third processor 252.

The third communication interface 251 may perform information interaction with another device.

The third processor 252 is connected with the third communication interface 251 to implement information interaction with the other device, and is configured to run a computer program to execute the method provided in one or more technical solutions for the second network device side. The computer program is stored in a third memory 253.

Of course, in practical applications, each component in the second network device 250 is coupled through a bus system 254. It can be understood that the bus system 254 is configured to implement connection communication between these components. The bus system 254 includes a data bus, and further includes a power bus, a control bus, and a state signal bus. However, for clear description, various buses in FIG. 25 are marked as the bus system 254.

In the embodiments of the application, the third memory 253 is configured to store various types of data to support the operations of the second network device 250. Examples of the data include any computer program operated in the second network device 250.

The method disclosed in the embodiments of the application may be applied to the third processor 252 or implemented by the third processor 252. The third processor 252 may be an integrated circuit chip with a signal processing capability. In an implementation process, each step of the method may be completed by an integrated logic circuit in a hardware form in the third processor 252 or an instruction in a software form. The third processor 252 may be a universal processor, a DSP or another PLD, a discrete gate or transistor logic device, a discrete hardware component, etc. The third processor 252 may implement or execute each method, step, and logical block diagram disclosed in the embodiments of the application. The universal processor may be a microprocessor, any conventional processor or the like. The steps of the method disclosed in combination with the embodiments of the application may be directly embodied to be executed and completed by a hardware decoding processor or executed and completed by a combination of hardware and software modules in the decoding processor. The software module may be in a storage medium, and the storage medium is in the third memory 253. The third processor 252 reads information in the third memory 253, and completes the steps of the method in combination with hardware.

In an exemplary embodiment, the second network device 250 may be implemented by one or more ASICs, DSPs, PLDs, CPLDs, FPGAs, universal processors, controllers, MCUs, microprocessors, or other electronic components, and is configured to execute the abovementioned method.

The memory (for example, the first memory 233, the second memory 243, and the third memory 253) in the embodiments of the application may be a volatile memory or a nonvolatile memory, and may also include both the volatile and nonvolatile memories. The nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, a compact disc, or a Compact Disc Read-Only Memory (CD-ROM). The magnetic surface memory may be a disk memory or a tape memory. The volatile memory may be a Random Access Memory (RAM), and is used as an external high-speed cache. It is exemplarily but unlimitedly described that RAMs in various forms may be adopted, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM) and a Direct Rambus Random Access Memory (DRRAM). The memory described in the embodiments of the application is intended to include, but not limited to, memories of these and any other proper types.

In an exemplary embodiment, the embodiment of the application also provides a storage medium, i.e., a computer storage medium, specifically a computer-readable storage medium. For example, the storage medium is a first memory 233 including a computer program, and the computer program may be executed by a first processor 232 of a first network device 230 to implement the steps of the method for the network device side. For another example, the storage medium is a second memory 243 including a computer program, and the computer program may be executed by a second processor 232 of a terminal 240 to implement the steps of the method for the terminal side. For another example, the storage medium is a third memory 253 including a computer program, and the computer program may be executed by a third processor 232 of a second network device 250 to implement the steps of the method for the terminal side. The computer-readable storage medium may be a memory such as an FRAM, a ROM, a PROM, an EPROM, an EEPROM, a flash memory, a magnetic surface memory, a compact disc, or a CD-ROM.

It is to be noted that "first", "second" and the like are adopted to distinguish similar objects and not intended to describe a specific sequence or order.

In addition, the technical solutions recorded in the embodiments of the application may be freely combined without conflicts.

The above is only the preferred embodiment of the application and not intended to limit the scope of protection of the application.

The invention claimed is:

1. A method for Conditional HandOver (CHO)-based processing, applied to a first network device, and the method comprising:
   determining information of invalid CHO configuration; and
   indicating the information of invalid CHO configuration to a terminal,
   wherein an indication manner comprises at least one of:
      information of one or more invalid frequencies; or
      a related identity of an invalid cell;
   wherein the CHO configuration comprises an identity relevant to a target cell and an event that triggers HandOver (HO),
   wherein the CHO configuration is configured to cause the terminal to execute one of the following operations:
      determining to perform CHO, and performing the CHO by using a configured cell-level dedicated random access resource for CHO; and
      after the CHO configuration is received, starting a first timer, wherein after the first timer expires, at least one of a configured condition is invalid, or a random access resource, configured for CHO of the terminal, of at least one candidate second network device for the HO is releasable.

2. The method of claim 1, further comprising:
   sending information indicating that the first network device supports CHO to the terminal.

3. A method for Conditional HandOver (CHO)-based processing, applied to a terminal, and the method comprising:
   receiving information of invalid CHO configuration indicated by a first network device; and
   updating information of local CHO configuration with the information of the indicated invalid CHO configuration,
   wherein a manner of indication comprises at least one of:
      information of one or more invalid frequencies; or
      a related identity of an invalid cell;
   wherein the CHO configuration comprises an identity relevant to a target cell and an event that triggers HandOver (HO),
   wherein the method further comprises executing one of the following operations based on configuration information of CHO:
      determining to perform CHO, and performing the CHO by using a configured cell-level dedicated random access resource for CHO; and
      after the configuration information of CHO is received, starting a first timer, wherein after the first timer expires, at least one of a configured condition is invalid, or a random access resource, configured for CHO of the terminal, of at least one candidate second network device for the HO is releasable.

4. The method of claim 3, further comprising:
   receiving information indicating that the first network device supports CHO from the first network device.

5. A method for Conditional HandOver (CHO)-based processing, applied to a first network device, and the method comprising:
   determining information of invalid CHO configuration; and
   indicating the information of invalid CHO configuration to a terminal, wherein an indication manner comprises at least one of:
      information of one or more invalid frequencies; or
      a related identity of an invalid cell;
   wherein the method further comprises:
      sending priority information to at least one candidate second network device for HandOver (HO), the priority information being configured to indicate a priority at which the at least one candidate second network device serves the terminal, wherein the CHO configuration comprises an identity relevant to a target cell and an event that triggers the HO, wherein the first network device presently provides service for the terminal, wherein sending the priority information to the at least one candidate second network device for the HO comprises:

sending a HO request message to the at least one candidate second network device, the HO request message containing the priority information.

6. The method of claim 5, wherein the at least one candidate second network device configures, for the terminal, a User Equipment (UE)-level dedicated random access resource for CHO or a cell-level dedicated random access resource for CHO.

7. The method of claim 5, further comprising:

sending information indicating that the first network device supports CHO to at least one of the terminal or the at least one candidate second network device.

8. The method of claim 3, wherein the at least one candidate second network device configures a User Equipment (UE)-level dedicated random access resource for CHO or a cell-level dedicated random access resource for CHO for the terminal.

9. The method of claim 1, further comprising:

configuring CHO information corresponding to each frequency for the terminal.

10. The method of claim 3, further comprising:

determining to perform the HO, and determining a cell for the HO;

determining a random access resource using CHO configuration information corresponding to a frequency of the cell for the HO; and performing cell HO using the determined random access resource.

11. The method of claim 1, further comprising:

configuring CHO information for multiple candidate cells for the terminal, and configuring priority information of the CHO information for the multiple candidate cells.

12. The method of claim 11, wherein the priority information is configured implicitly or explicitly.

13. The method of claim 3, further comprising:

determining to perform the HO;

determining CHO information for the target cell according to configured priority information of CHO information for multiple candidate cells; and performing cell HO using a dedicated random access resource corresponding to the CHO information for the target cell.

14. The method of claim 3, further comprising:

determining the target cell for the HO;

determining a HO solution for the target cell using configuration information of the HO solution for the target cell; and performing cell HO using the determined HO solution, the configuration information representing that the HO solution for access of the terminal to the target cell is one of the following solutions:

a Make-before-break solution;

an enhanced Make-before-break solution;

a Random Access Channel (RACH)-less solution;

a Dual Active Protocol Stack (DAPS) solution; and a dual-connectivity-based solution.

15. A first network device, comprising a first processor and a first memory configured to store a computer program configured to run in the first processor, wherein the first processor is configured to run the computer program to execute the steps of the method of claim 1.

16. A terminal, comprising a second processor and a second memory configured to store a computer program configured to run in the second processor, wherein the second processor is configured to run the computer program to execute the steps of the method of claim 3.

17. A first network device, comprising a first processor and a first memory configured to store a computer program configured to run in the first processor, wherein the first processor is configured to run the computer program to execute the steps of the method of claim 5.

* * * * *